United States Patent
Kim et al.

(10) Patent No.: US 10,582,497 B2
(45) Date of Patent: *Mar. 3, 2020

(54) METHOD AND DEVICE FOR TRANSMITTING FRAME IN WIRELESS LAN

(71) Applicant: LG ELECTRONICS INC., Seoul (KR)

(72) Inventors: Suhwook Kim, Seoul (KR); Kiseon Ryu, Seoul (KR); Wookbong Lee, Seoul (KR); Jinsoo Choi, Seoul (KR); Hangyu Cho, Seoul (KR); Jeongki Kim, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,496

(22) Filed: Dec. 21, 2018

(65) Prior Publication Data
US 2019/0124657 A1    Apr. 25, 2019

Related U.S. Application Data

(63) Continuation of application No. 15/118,088, filed as application No. PCT/KR2014/012437 on Dec. 17, 2014, now Pat. No. 10,187,885.

(Continued)

(51) Int. Cl.
*H04W 72/04* (2009.01)
*H04W 74/08* (2009.01)
(Continued)

(52) U.S. Cl.
CPC ....... *H04W 72/0446* (2013.01); *H04L 5/0007* (2013.01); *H04W 72/042* (2013.01);
(Continued)

(58) Field of Classification Search
None
See application file for complete search history.

(56) References Cited

U.S. PATENT DOCUMENTS

| 2010/0316150 A1* | 12/2010 | Amini | H04W 74/02 |
| | | | 375/260 |
| 2012/0082040 A1* | 4/2012 | Gong | H04L 5/0062 |
| | | | 370/252 |

(Continued)

FOREIGN PATENT DOCUMENTS

| JP | 2012511860 | 5/2012 |
| JP | 2013541293 | 11/2013 |

(Continued)

OTHER PUBLICATIONS

Japan Patent Office Application No. 2016-551147, Notice of Allowance dated Jun. 5, 2018, 2 pages.

(Continued)

*Primary Examiner* — Kouroush Mohebbi
(74) *Attorney, Agent, or Firm* — Lee Hong Degerman Kang Waimey

(57) ABSTRACT

A method and a device for transmitting a frame in a wireless LAN are disclosed. A method for transmitting a data unit in a wireless LAN can comprise the steps of: transmitting, by an AP, an RTS frame for medium protection to a plurality of STAs through a plurality of channels; receiving, by the AP, a CTS frame in response to the RTS frame from each of the plurality of STAs through a first allocation channel, wherein the first allocation channel is at least one of the plurality of channels, which is determined on the basis of the RTS frame; and transmitting, by the AP, downlink data to each of the plurality of STAs through a second allocation channel on the basis of OFDMA in overlapped time resources, wherein the second allocation channel is at least one of the plurality of channels.

15 Claims, 14 Drawing Sheets

Related U.S. Application Data

(60) Provisional application No. 61/938,101, filed on Feb. 10, 2014, provisional application No. 61/938,647, filed on Feb. 11, 2014.

(51) Int. Cl.
  *H04L 5/00* (2006.01)
  *H04L 27/26* (2006.01)
  *H04W 84/12* (2009.01)

(52) U.S. Cl.
  CPC ..... *H04W 74/0816* (2013.01); *H04L 27/2602* (2013.01); *H04W 84/12* (2013.01)

(56) References Cited

U.S. PATENT DOCUMENTS

| | | |
|---|---|---|
| 2012/0082147 A1 | 4/2012 | Liu et al. |
| 2012/0099664 A1 | 4/2012 | Cheong et al. |
| 2012/0147804 A1 | 6/2012 | Hedayat et al. |
| 2013/0188571 A1 | 7/2013 | Cheong et al. |
| 2014/0369303 A1 | 12/2014 | Gong et al. |
| 2016/0360528 A1 | 12/2016 | Kim et al. |

FOREIGN PATENT DOCUMENTS

| | | | |
|---|---|---|---|
| JP | 2013543702 | 12/2013 | |
| WO | 2010068065 | 6/2010 | |
| WO | 2012040495 | 3/2012 | |
| WO | 2013022253 | 2/2013 | |
| WO | 2013022254 | 2/2013 | |
| WO | WO-2013022253 A2 * | 2/2013 | ........ H04W 74/0816 |
| WO | 2013040560 | 3/2013 | |
| WO | 2014014084 | 1/2014 | |

OTHER PUBLICATIONS

Morioka, Y. et al., "Multi-RTS Proposal", doc.: IEEE 802.11-10/1124r02, Sep. 2010, 14 pages.

European Patent Office Application Serial No. 14882095.4, Search Report dated Sep. 15, 2017, 9 pages.

Japan Patent Office Application No. 2016-551147, Office Action dated Nov. 7, 2017, 3 pages.

Gross, J. et al., "Dynamic Multi-user OFDM for 802.11 systems," doc.: IEEE 802.11-07/2062r1, Jul. 2007, 23 pages.

* cited by examiner

METHOD AND DEVICE FOR TRANSMITTING FRAME IN WIRELESS LAN

CROSS-REFERENCE TO RELATED APPLICATIONS

This application is a continuation of U.S. patent application Ser. No. 15/118,088, filed on Aug. 10, 2016, now U.S. Pat. No. 10,187,885, which is the National Stage filing under 35 U.S.C. 371 of International Application No. PCT/KR2014/012437, filed on Dec. 17, 2014, which claims the benefit of U.S. Provisional Application No. 61/938,101, filed on Feb. 10, 2014, and 61/938,647, filed on Feb. 11, 2014, the contents of which are all hereby incorporated by reference herein in their entirety.

BACKGROUND OF THE INVENTION

Field of the Invention

The present invention relates to wireless communications, and more particularly, to a method and an apparatus for transmitting a frame a wireless local area network (WLAN).

Related Art

A wide range of bandwidths from 20 MHz to 160 MHz become available for the existing wireless local area network (WLAN) system. Accordingly, choosing an appropriate channel bandwidth for communications between transmitting and receiving terminals is a determining factor for Wi-Fi performance.

To choose an appropriate channel bandwidth for communications between transmitting and receiving terminals, a dynamic channel bandwidth setting protocol based on a Request to Send (RTS) frame and a Clear to Send (CTS) frame has been developed for IEEE 802.11ac and subsequent standards. Initial RTS and CTS frames are designed to reduce a hidden node issue and data frame collision overheads. A transmitting terminal transmits an RTS frame to a receiving terminal before transmitting a data frame. The destination terminal, which has received the RTS frame, responds with a CTS frame to the transmitting terminal. Third terminals, which have received the RTS frame and a CTS control frame, may delay medium access for a certain period of time in order to protect the data frame to be subsequently transmitted.

According to the dynamic channel bandwidth setting protocol supported by IEEE 802.11ac and subsequent standards, the transmitting terminal transmits the RTS frame via a wide band grater than a channel bandwidth of 20 MHz, and the destination terminal may respond with the CTS frame according to a channel bandwidth currently available for the destination terminal. For example, when the transmitting terminal wishes to use a 160 MHz channel bandwidth, the transmitting terminal transmits the RTS frame through the 160 MHz channel bandwidth. If an 80 MHz channel bandwidth is currently available for the destination terminal, the destination terminal transmits the CTS frame through the 80 MHz channel bandwidth. When the transmitting terminal, which has transmitted the RTS frame, receives the CTS frame through the 80 MHz channel bandwidth, the transmitting terminal needs to transmit a data frame, subsequently transmitted to the target terminal, through a channel bandwidth of 80 MHz or smaller.

SUMMARY OF THE INVENTION

An aspect of the present invention is to provide a method of transmitting a frame in a wireless local area network (WLAN).

Another aspect of the present invention is to provide an apparatus that performs a method of transmitting a frame in a WLAN.

To achieve the aforementioned purposes of the present invention, a method of transmitting a frame in a wireless local area network (WLAN) according to one aspect of the present invention may include transmitting, by an access point (AP), a Request to Send (RTS) frame for medium protection to a plurality of stations (STAs) through a plurality of channels; receiving, by the AP, a Clear to Send (CTS) frame in response to the RTS frame from each of the STAs through a first allocated channel, the first allocated channel being at least one channel among the plurality of channels determined based on the RTS frame; and transmitting, by the AP, downlink data to each of the plurality of STAs through a second allocated channel based on orthogonal frequency division multiplexing access (OFDMA) on an overlapping time resource, the second allocated channel being at least one channel among the plurality of channels.

To achieve the aforementioned purposes of the present invention, an AP for transmitting a frame in a WLAN according to another aspect of the present invention may include a radio frequency (RF) unit configured to transmit or receive a radio signal; and a processor operatively connected to the RF unit, wherein the processor may be configured to: transmit an RTS frame for medium protection to a plurality of STAs through a plurality of channels; receive a CTS frame in response to the RTS frame from each of the STAs through a first allocated channel; and transmit downlink data to each of the plurality of STAs through a second allocated channel based on orthogonal frequency division multiplexing access (OFDMA) on an overlapping time resource, in which the first allocated channel is at least one channel among the plurality of channels determined based on the RTS frame and the second allocated channel is at least one channel among the plurality of channels.

Data may be transmitted to each of a plurality of STAs on an overlapping time resource, thereby increasing communication efficiency.

DESCRIPTION OF EXEMPLARY EMBODIMENTS

Figure 1:
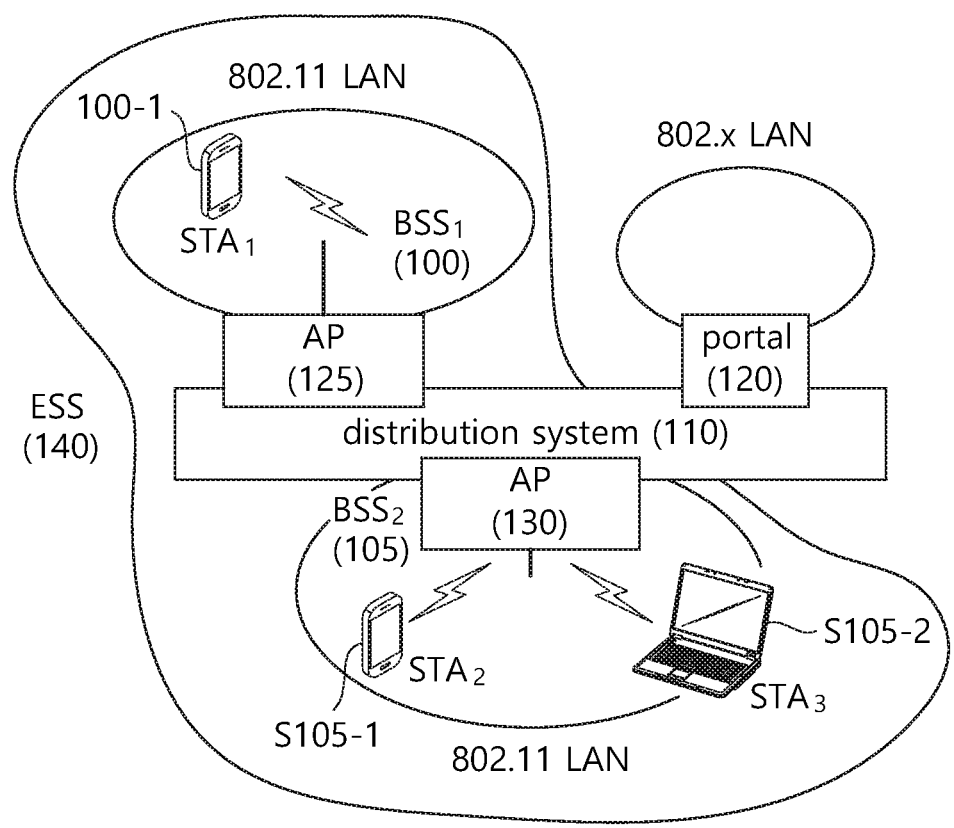
FIG. 1 is a conceptual view illustrating a structure of a wireless local area network (WLAN).
Figure 1:
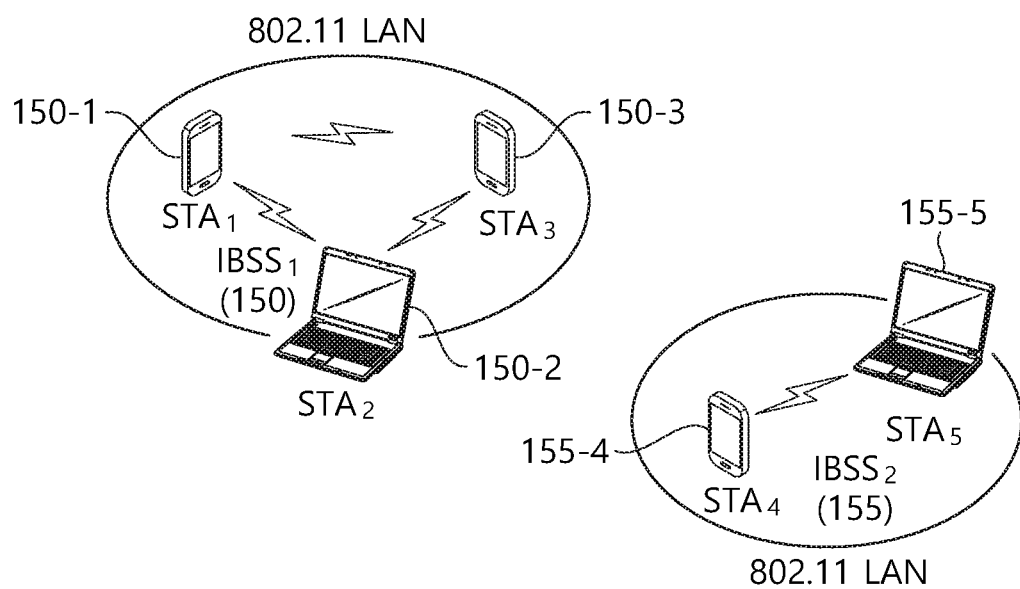

FIG. 1 is a conceptual view illustrating a structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a conceptual view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.).

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
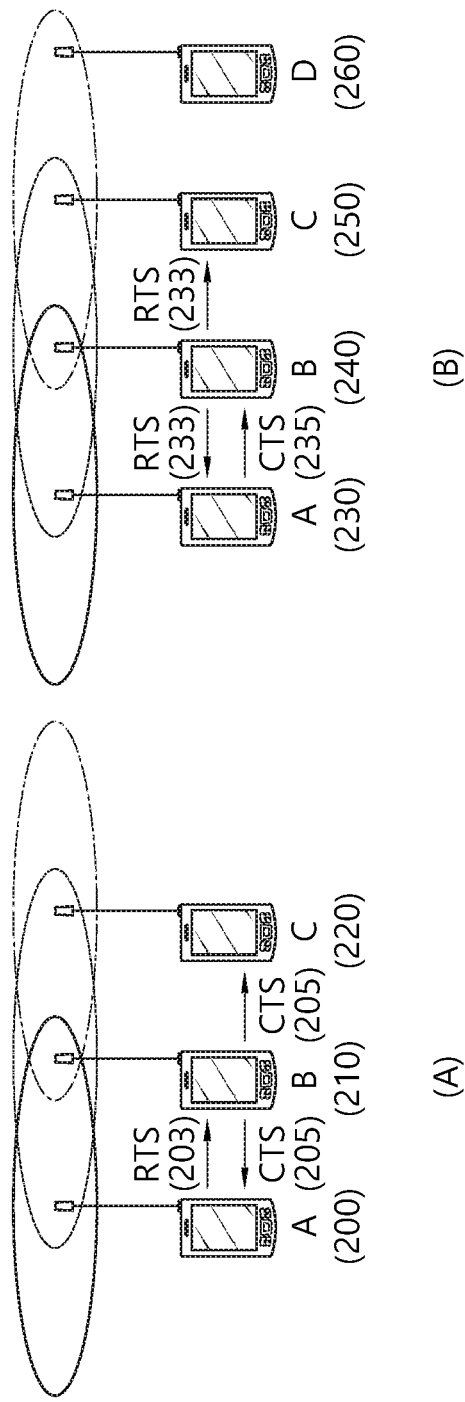
FIG. 2 is a conceptual view illustrating a method of using a Request to Send (RTS) frame and a Clear to Send (CTS) frame in order to resolve a hidden node issue and an exposed node issue.

FIG. 2 is a conceptual view illustrating a method of using a Request to Send (RTS) frame and a Clear to Send (CTS) frame in order to resolve a hidden node issue and an exposed node issue.

Referring to FIG. 2, a short signaling frame, such as an RTS frame and a CTS frame, may be used to solve the hidden node issue and the exposed node issue. Neighboring STAs may recognize based on the RTS frame and the CTS frame whether data transmission and reception is performed between two STAs.

(A) of FIG. 2 illustrates a method of transmitting an RTS frame 203 and a CTS frame 205 in order to solve the hidden node issue.

It may be assumed that both STA A 200 and STA C 220 intend to transmit data frames to STA B 210. STA A 200 transmits an RTS frame 203 to STA B 210 before transmitting a data frame, and STA B 210 may transmit a CTS frame 205 to STA A 200. STA C 220 overhears the CTS frame 205 and recognizes that transmission of a frame is performed via a medium from STA A 200 to STA B 210. STA C 220 may set a network allocation vector (NAV) until STA A 200 finishes transmitting the data frame to STA B 210. Using such a method may prevent a collision between frames due to a hidden node.

(B) of FIG. 2 illustrates a method of transmitting an RTS frame 233 and a CTS frame 235 in order to solve the exposed node issue STA C 250 may determine whether a collision occurs if transmitting a frame to another STA D 260 based on monitoring of an RTS frame 233 and a CTS frame 235 between STA A 230 and STAB 240.

STA B 240 transmits the RTS frame 233 to STA A 230, and STA A 230 may transmit the CTS frame 235 to STA B 240. STA C 250 overhears only the RTS frame 233 transmitted by STA B 240 and does not overhear the CTS frame 235 transmitted by STA A 230. Thus, STA C 250 recognizes that STA A 230 is out of a carrier sensing range of STA C 250. Accordingly, STA C 250 may transmit data to STA D 260.

An RTS frame format and a CTS frame format are disclosed in 8.3.1.2 RTS frame format and 8.3.1.3 CTS frame format of IEEE P802.11-REVmc™/D2.0, October 2013.

Figure 3:
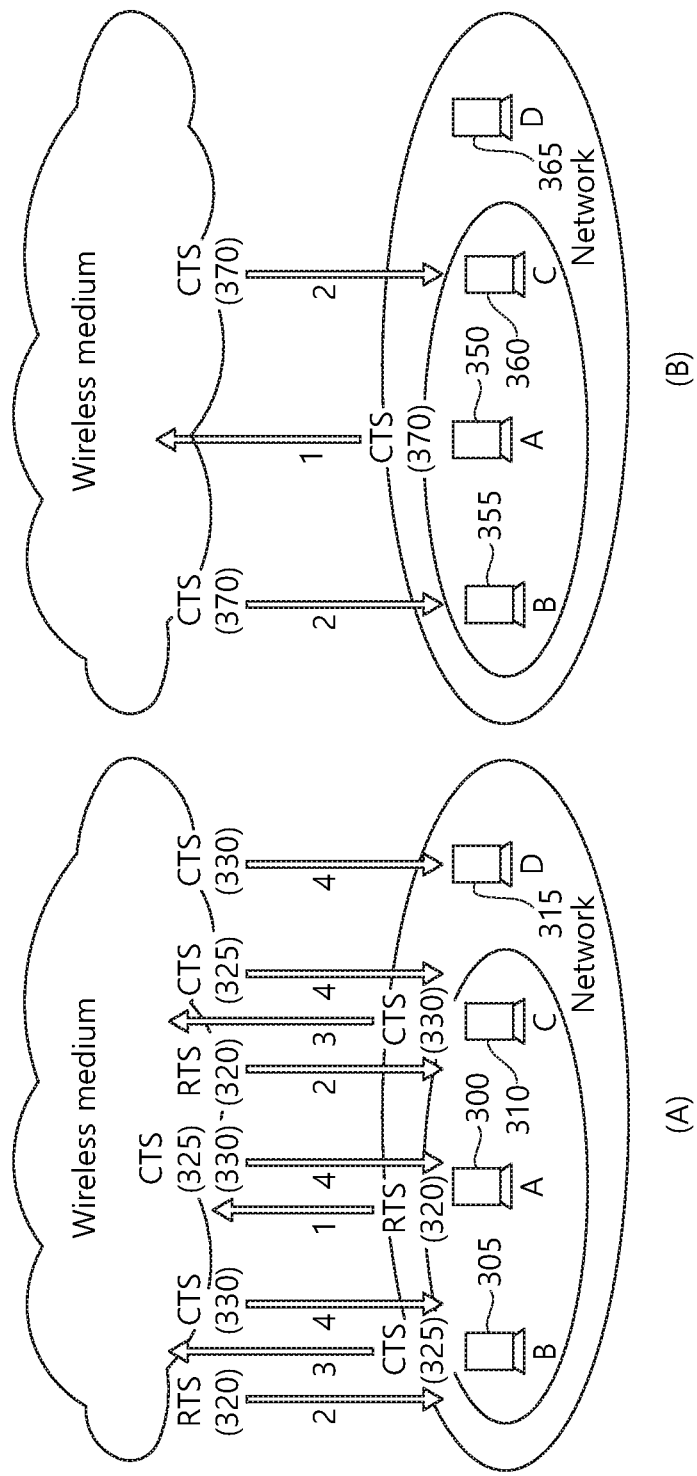
FIG. 3 is a conceptual view illustrating a CTS-to-Self mechanism.

FIG. 3 is a conceptual view illustrating a CTS-to-Self mechanism.

Referring to FIG. 3, a case of sensing a medium using a method of exchanging an RTS frame and a CTS frame ((A) of FIG. 3) is compared with a case of sensing a medium using a CTS-to-Self frame ((B) of FIG. 3).

In the IEEE 802.11g standard, a CTS-to-Self protection mechanism is defined. The CTS-to-Self protection mechanism may be used instead of a medium sensing mechanism using an RTS frame and a CTS frame. Using the CTS-to-Self protection mechanism may allow reduction in overheads for a medium as compared with using the medium sensing mechanism using the RTS/CTR frame.

Referring to (A) of FIG. 3, a method for a transmitting end to exchange an RTS frame and a CTS frame before transmitting a data frame may be performed as follows.

In (A) of FIG. 3, it is assumed that STA A 300 intends to transmit a data frame to STAB 305 or STA C 310.

1) STA A 300 transmits an RTS frame 320.
2) The RTS frame 320 is received by STA B 305 and STA C 310, which are in a carrier sensing range.
3) STAB 305 and STA C 310 transmit CTS frames 325 and 330.
4) The transmitted CTS frames 325 and 330 are transmitted to STA A 300, STAB 305, STA C 310, and STA D 315.

STA D 315 is out of the carrier sensing range of STA A 300 and thus does not receive the RTS frame 320, transmitted by STA A 300 (that is, STA D 315 is a hidden node for STA A 300). However, STA D 315 receives the CTS frame 330, transmitted from STA C 310, thereby recognizing that STA A 300 occupies a medium to transmit data. STA D may set an NAV and may not access the medium.

5) STAA 300 transmits a data frame to STA C 310.

Referring to (B) of FIG. 3, a medium sensing method based on a CTS-to-Self frame, which is performed by a transmitting end before transmission of a data frame, may be performed as follows. In (B) of FIG. 3, it is assumed that STA A 350 intends to transmit a data frame to STA C 360.

1) STA A 350 transmits a CTS-to-Self frame 370 to STA B 355 and STA C 360, which are in a carrier sensing range.
2) STA B 355 and STA C 360, which have received the CTS-to-Self frame 370, defers transmission of another data frame in order to receive a data frame transmitted from STAA 350.

When the foregoing method is used, STA D 365, which is out of the coverage range of STAA 350, may not receive the CTS-to-Self frame 370 from STA A 350. Thus, STA D 365 may not recognize whether STAA 350 transmits a data frame.

In this case, if STA D 365 transmits a data frame to STA A 350 or STA C 360, a collision between data frames may occur. That is, the method using the CTS-to-Self frame 370 may not resolve a hidden node issue. Thus, the method using the CTS-to-Self frame 370 may be applied only when STAs are capable of sensing reciprocal transmissions of data frames, and the RTS/CTS frame exchange method may be used to sense a medium in other cases.

An AP operating in a WLAN system may transmit different data to a plurality of STAs through the same (or overlapping) time resource. Defining transmission from the AP to an STA as downlink transmission, the foregoing AP transmission may be referred to as downlink multi-user transmission (DL MU transmission).

In an existing WLAN system, an AP may perform DL MU transmission based on MU multiple-input multiple-output (MIMO), which may be referred to as DL MU MIMO transmission. Unlike in the existing WLAN system, an AP operating in a WLAN system according to an embodiment of the present invention may perform DL MU transmission based on orthogonal frequency division multiplexing access (OFDMA), which may be referred to as DL MU OFDMA transmission. When DL MU OFDMA transmission is used, the AP may transmit a downlink frame to each of a plurality of STAs through each of a plurality of frequency resources (or sub-bands) on an overlapping time resource.

A physical layer convergence procedure (PLCP) protocol data unit (PPDU), frame, and data transmitted via downlink transmission may be referred to as a downlink PPDU, downlink frame, and downlink data, respectively. A PPDU may be a data unit including a PPDU header and a PLCP service data unit (PSDU or medium access control (MAC) protocol data unit (MPDU)). The PPDU header may include a PHY header and a PHY preamble, and the PSDU (or MPDU) may include or indicate a frame.

On the contrary, transmission from an STA to an AP may be referred to as uplink transmission. Transmitting data from a plurality of STAs to the AP on the same (or overlapping) time resource may be referred to as uplink (UL) MU transmission. Unlike in the existing WLAN system, the WLAN system according to the embodiment of the present invention may support UL MU transmission. A PPDU, frame, and data transmitted via uplink transmission may be referred to as an uplink PPDU, uplink frame, and uplink data, respectively. Uplink transmissions by a plurality of STAs may be performed based on different frequency resources (sub-bands) or different space-time streams (or spatial streams).

When uplink transmissions by a plurality of STAs are performed on different frequency resources (different sub-bands), the different frequency resources may be allocated based on OFDMA for the respective STAs as uplink transmission resources. The respective STAs may transmit an uplink frame to the AP through the different allocated frequency resources on the overlapping time resource. This transmission method using different frequency resources may be referred to as a UL MU OFDMA transmission method.

When uplink transmissions by a plurality of STAs are performed on different space-time stream resources, the different space-time stream resources (or spatial streams) may be allocated for the respective STAs. The respective STAs may transmit an uplink frame to the AP through the different space-time streams. This transmission method using different spatial streams may be referred to as a UL MU MIMO transmission method.

For a next-generation WLAN, there are increasing demands for improvement in high throughput and quality of experience (QoE). When a new frame (or PPDU) or format is adopted for a next-generation WLAN system, it is necessary to design the new system without causing any impact on the performance of legacy STAs that support only the existing WLAN system. Further, the next-generation WLAN system needs designing not to be influenced in performance by legacy STAs.

As described above, the existing WLAN system is incapable of supporting DL MU OFDMA transmission, UL MU MIMO transmission, and UL MU OFDMA transmission. In the existing WLAN system, a multichannel-based wider bandwidth is allocated for communications between one STA and one AP. A multichannel may have a bandwidth of greater than 20 MHz including a primary channel and a non-primary channel (for example, a secondary channel).

In the existing WLAN system, frequency resources are managed based on a primary channel rule. According to the primary channel rule, an STA is allowed to communicate through a multichannel including a primary channel and a non-primary channel (or secondary channel) only when the non-primary channel is idle. Hereinafter, a method for an AP to transmit a plurality of downlink frames respectively to a plurality of STAs based on DL MU OFDMA is illustrated.

Figure 4:
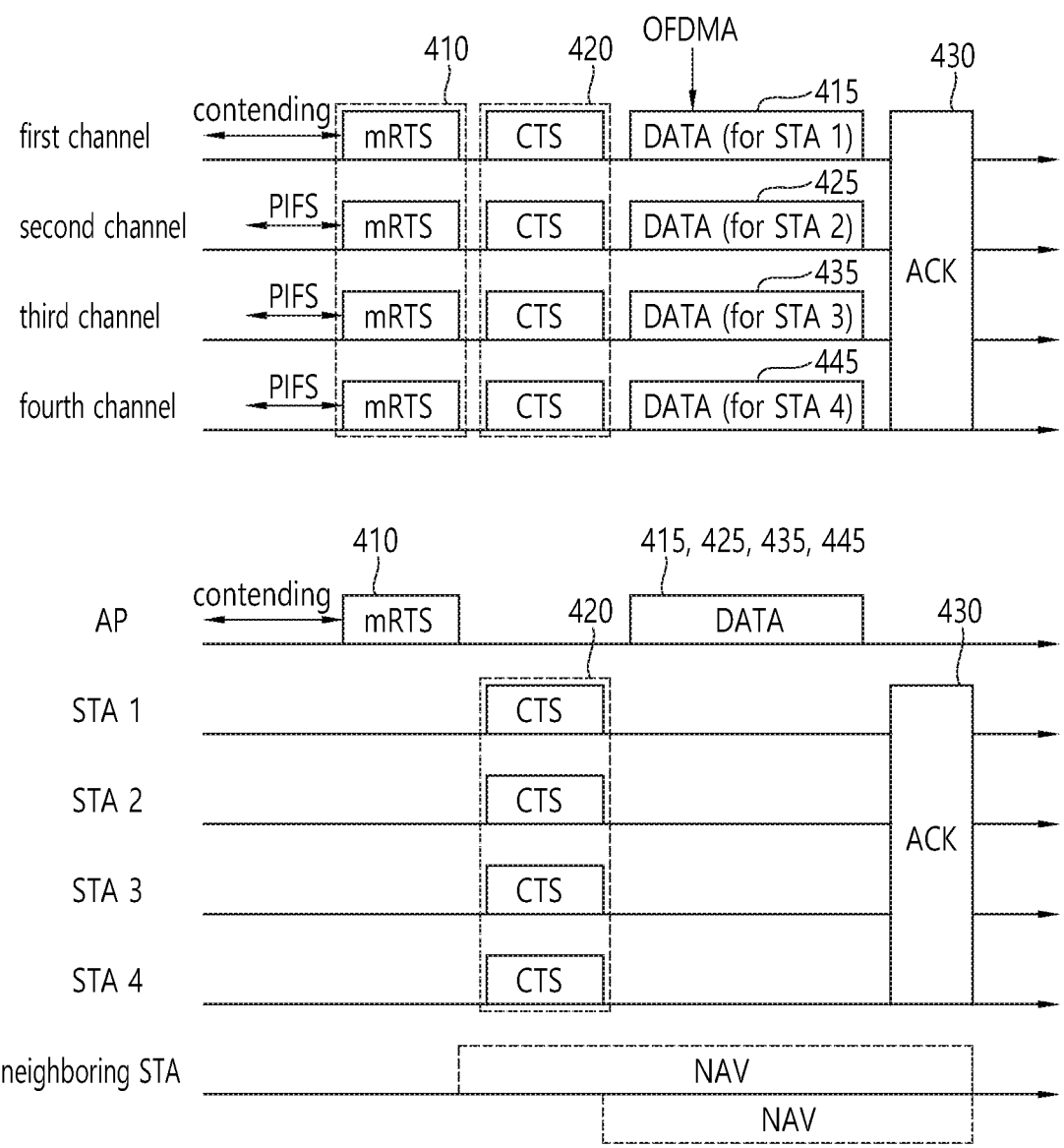
FIG. 4 is a conceptual view illustrating a medium protection method in OFDMA-based communication in a WLAN according to an embodiment of the present invention.

FIG. 4 is a conceptual view illustrating a medium protection method in OFDMA-based communication in a WLAN according to an embodiment of the present invention.

FIG. 4 illustrates a method in which an AP performs medium protection based on an RTS frame 410 and a CTS frame 420 and transmits downlink data 415, 425, 435, and 445 respectively to a plurality of STAs through DL MU OFDMA transmission.

Referring to FIG. 4, the AP may transmit the RTS frame 410 through a multichannel based on the primary channel rule. The multichannel may include a primary channel and a non-primary channel (or secondary channel).

For example, one 20 MHz channel band among four 20 MHz channel bands included in an 80 MHz channel band may be set as a primary channel for TXOP initial access. The AP may perform a back-off procedure for channel access to the set primary channel.

Specifically, the AP may perform TXOP initial access through the back-off procedure in the primary channel. The AP may identify a channel state of a non-primary channel during a point coordination function (PCF) interframe space (PIFS) prior to the expiry of a back-off timer. In FIG. 4, a first channel may be the primary channel, and second, third, and fourth channels may be non-primary channels.

In the following embodiment of the present invention, the first channel may indicate a primary channel, and the second, third, and fourth channels may indicate non-primary channels (or secondary channels). Further, although the present invention illustrates four channels (first to fourth channels) for convenience of description, the medium protection method and downlink frame transmission method in OFDMA-based communication according to the embodiment of the present invention may also be used for a different number of channels, which is also included in the scope of the present invention.

The AP may determine channel states of the second, third, and fourth channels during the PIFS prior to a TXOP in order to identify whether the second to fourth channels are idle or busy. If the second, third, and fourth channels are idle during the PIFS, the AP may determine that the second, third, and fourth channels are idle. Although FIG. 4 illustrates that the second, third, and fourth channels are idle for convenience of description, there may be a channel determined as being busy among the second, third, and fourth channels. The CTS frame 420 may not be transmitted through a channel determined as being busy.

The AP may transmit an RTS PPDU (or RTS frame 410) in a duplicated PPDU format (or duplicated frame format) through the first channel in which channel access is performed and the second, third, and fourth channels of which the channel states are determined to be idle. The duplicated PPDU format may be a format including a duplicated field. Specifically, when the duplicated PPDU format is used, a duplicated field of a field transmitted on the primary channel may be transmitted through the non-primary channels.

The RTS PPDU in the duplicated PPDU format may include an RTS PPDU transmitted on the first channel and duplicated RTS PPDUs transmitted respectively through the second, third, and fourth channels. The duplicated RTS PPDUs transmitted respectively through the second, third, and fourth channels may be duplicated PPDUs of the RTS PPDU transmitted on the first channel. On the basis of a frame unit, the RTS frame transmitted on the first channel and the duplicated RTS frames transmitted respectively through the second, third, and fourth channels may be represented by one RTS frame 410 in the duplicated frame format. That is, the one RTS frame 410 in the duplicated frame format may include the RTS frame transmitted on the first channel and the duplicated RTS frames transmitted through the second, third, and fourth channels.

In FIG. 4, it is assumed that all of the second, third, and fourth channels are idle. Thus, the AP may transmit the RTS PPDU (or RTS frame 410) in the duplicated PPDU format (or duplicated frame format) through the first, second, third, and fourth channels (for example, 80 MHz).

The RTS frame 410 transmitted by the AP may include identification (ID) information indicating a plurality of STAs to transmit a CTS frame 420. For example, a Receiver Address (RA) field of the RTS frame 410 may include the ID information (for example, association identifier (AID)) on the plurality of STAs to transmit the CTS frame 420. In FIG. 4, the RA field of the RTS frame 410 may include AID1 of STA1, AID2 of STA2, AID3 of STA3, and AID4 of STA4. A format (or structure) of the RTS frame 410 will be described below.

STA 1, STA2, STA3, and STA4, which have received the RTS frame 410, may respectively transmit CTS frames 420 in response to the RTS frame 410. STA 1, STA2, STA3, and STA4 may respectively transmit the CTS frames 420 including a filed containing the same data to the AP on an overlapping time resource (for example, after a short interframe space (SIFS) since the RTS frame 410 is received). Similarly to the RTS frame 410, the CTS frames 420 may be transmitted in the duplicated PPDU format to the AP through the first, second, third, and fourth channels.

In FIG. 4, it is assumed that the first, second, third, and fourth channels are idle. If a specific channel (for example, the third channel) among the first, second, third, and fourth channels is not idle for STA1, STA1 may not transmit the CTS frame through the third channel. If all of STA1 to STA4 do not transmit the CTS frames through the third channel, the AP may not receive the CTS frames through the third channel. In this case, the AP may not use the third channel when transmitting a downlink frame. That is, the AP may transmit downlink frames through the first, second, and fourth channels except for the third channel.

The following description will be made assuming that the AP receives the CTS frames 420 contained in the duplicated PPDU formats through the first, second, third, and fourth channels.

The AP may transmit a plurality of downlink data (or downlink frames or downlink PPDUs) 415, 425, 435, and 445 respectively to the plurality of STAs through sub-bands (or frequency resources) allocated for the respective STAs based on DL MU OFDMA transmission. That is, the AP may transmit the downlink data 415, 425, 435, and 445 to the respective STAs in a PPDU format for DL MU OFDMA transmission.

For example, the AP may transmit, using the PPDU format for DL MU OFDMA, downlink data 1 415 to STA 1 through the first channel (or sub-band 1) allocated for STA1, downlink data 2 425 to STA2 through the second channel (or sub-band 2) allocated for STA2, downlink data 3 435 to STA 3 through the third channel (or sub-band 3) allocated for STA3, and downlink data 4 445 to STA4 through the fourth channel (or sub-band 4) allocated for STA4. That is, downlink data 1 415, downlink data 2 425, downlink data 3 435, and downlink data 4 445 may be transmitted by the AP on an overlapping time resource to STA1, STA2, STA3, and STA4, respectively.

Specifically, each of the plurality of STAs may acquire information on the channels (or sub-band) allocated for the respective STAs through a header of the downlink PPDU. A field preceding a specific field (for example, HE-SIG B) in the PPDU format for DL MU OFDMA may be transmitted in a duplicated form on different transmission resources. Further, the specific field (for example, HE-SIG B) in the PPDU format for DL MU OFDMA may be transmitted in an encoded form on all transmission resources, and a field following the specific field (for example, HE-SIG B) may include individual information for each of the plurality of STAs receiving the PPDUs. In this case, each of the STAs may monitor the plurality of channels to receive the downlink PPDU up to the specific field and may decode data transmitted through the channel allocated for each of the STAs to receive the downlink data for each of the STAs from the field following the specific field. The downlink PPDU format for DL MU OFDMA transmission by the AP will be described below.

Each of the STAs may transmit an ACK frame 430 to the AP based on UL MU OFDMA transmission through the sub-bands (or frequency resources) allocated to the respective STAs. For example, STA1 may transmit ACK frame 1 as a response to downlink data 1 415 through the first channel, STA2 may transmit ACK frame 2 as a response to downlink data 2 425 through the second channel, STA3 may transmit ACK frame 3 as a response to downlink data 3 435 through the third channel, and STA4 may transmit ACK frame 4 as a response to downlink data 4 445 through the fourth channel. That is, ACK frame 1, ACK frame 2, ACK frame 3, and ACK frame 4 may be transmitted to the AP respectively by STA1 to STA4 on an overlapping time resource.

A neighboring STA may receive the RTS frame 410 and/or the CTS frames 420 and may set an NAV. Specifically, the neighboring STA may set the NAV based on a Duration field of the RTS frame 410 and/or a Duration field of the CTS frames 420.

The foregoing case has been described assuming that the first, second, third, and fourth channels each have a 20 MHz unit. DL MU OFDMA-based downlink frame transmission may also be defined in a sub-band granularity less than 20 MHz (for example, 5 MHz). In this case, the first, second, third, and fourth channels may also be defined to have channel bands less than 20 MHz (for example, 5 MHz). In this case, the RTS frame 410 and the CTS frames 420 may be transmitted based on a non-duplicated PPDU format (or non-duplicated frame format). The non-duplicated PPDU format may be a format including no duplicated field. That is, when the non-duplicated PPDU format is used, one field which is not a duplicated field may be transmitted on a PPDU at a specific time through the entire channel band.

For example, when the first, second, third, and fourth channels each are 5 MHz, the RTS frame 410 may be transmitted by the AP via a non-duplicated format PPDU through the entire band (for example, 20 MHz) so that the neighboring STA sets the NAV. Likewise, the CTS frames 420, transmitted by the respective STAs, may be transmitted via a non-duplicated format PPDU through the entire band (for example, 20 MHz).

In the following embodiments of the present invention, each channel may have a bandwidth of 20 MHz or greater or less than 20 MHz.

Figure 5:
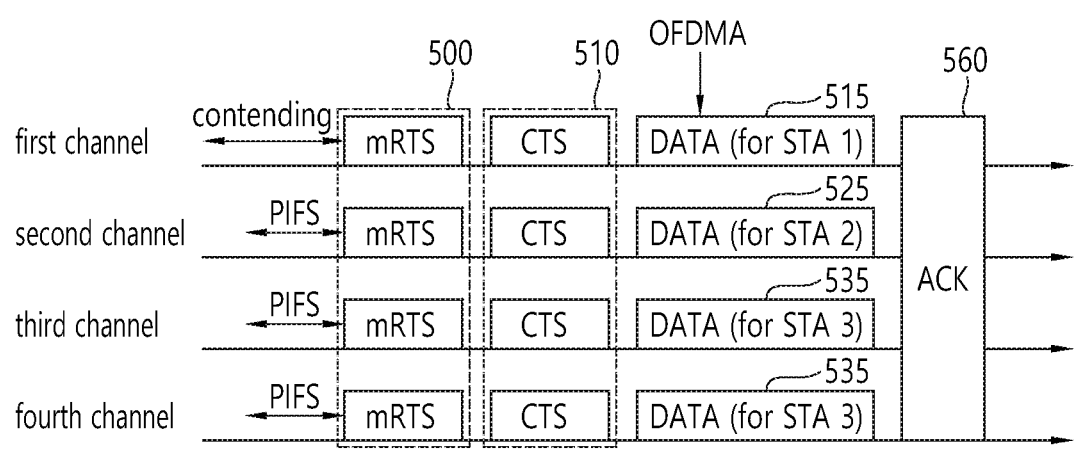
FIG. 5 is a conceptual view illustrating a medium protection method in OFDMA-based communication in a WLAN according to an embodiment of the present invention.
Figure 5:
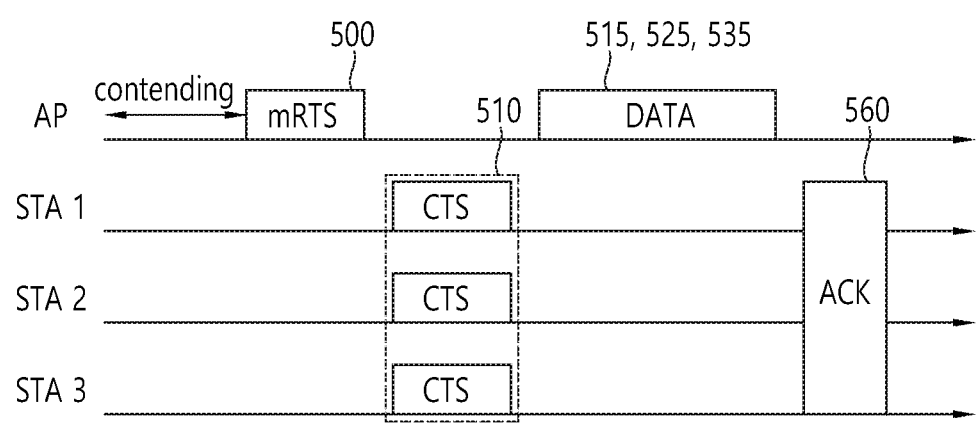

FIG. 5 is a conceptual view illustrating a medium protection method in OFDMA-based communication in a WLAN according to an embodiment of the present invention.

FIG. 5 illustrates a case where an AP performs medium protection based on an RTS frame 500 and a CTS frame 510 and transmits downlink data 515, 525, and 535 respectively to a plurality of STAs based on DL MU OFDMA transmission, in which channels allocated to the respective STAs for transmission of the downlink data 515, 525, and 535 have different bandwidths.

Referring to FIG. 5, as described above in FIG. 4, the AP may transmit the RTS frame 500 to STA1, STA2, and STA3 through first, second, third, and fourth channels. An RTS PPDU carrying the RTS frame 500 may be a duplicated format PPDU or a non-duplicated format PPDU. For example, as described above, the RTS PPDU may be transmitted as either the duplicated format PPDU or the non-duplicated format PPDU depending on channel bandwidths of the first, second, third, and fourth channels.

STA1, STA2, and STA3 may each transmit the CTS frame 510 to the AP in response to the RTS frame 500 through the first, second, third, and fourth channels. Likewise, a CTS PPDU may be transmitted as either a duplicated format PPDU or a non-duplicated format PPDU. The AP may receive the CTS frame 510 and may transmit downlink PPDUs to STA1, STA2, and STA3, respectively.

The AP may transmit, using the PPDU format for DL MU OFDMA, downlink data 1 515 through the first channel allocated for STA1, downlink data 2 525 through the second channel allocated for STA2, and downlink data 3 535 through the third and fourth channels allocated for STA3. That is, downlink data 1 515, downlink data 2 525, and downlink data 3 535 may be transmitted by the AP on an overlapping time resource to STA1 to STA3, respectively. When each sub-band has a size of 20 MHz, STA1 and STA2 may respectively receive the downlink data 515 and 525 through a 20 MHz channel bandwidth, and STA3 may receive the downlink data 535 through a 40 MHz channel bandwidth. When each sub-band has a size of 5 MHz, STA1 and STA2 may respectively receive the downlink data 515 and 525 through a 5 MHz channel bandwidth, and STA3 may receive the downlink data 535 through a 10 MHz channel bandwidth.

The plurality of STAs may acquire information on the channels allocated for the respective STAs based on a PPDU header of the downlink PPDUs transmitted based on the PPDU format for DL MU OFDMA. The respective STAs may receive the individual downlink data 515, 525, and 535 transmitted to the respective STAs through the allocated channels.

Each of the STAs may transmit an ACK frame 560 to the AP based on UL MU OFDMA transmission through the channels allocated to the respective STAs. For example, STA1 may transmit ACK frame 1 as a response to downlink data 1 515 through the first channel, STA2 may transmit ACK frame 2 as a response to downlink data 2 525 through sub-band 2, and STA3 may transmit ACK frame 3 as a response to downlink data 3 535 through the third and fourth channels. That is, downlink data 1 515, downlink data 2 525, and downlink data 3 535 may be transmitted to the AP by STA1 to STA3, respectively, on an overlapping time resource. That is, ACK frame 1, ACK frame 2, ACK frame 3, and ACK frame 4 may be transmitted to the AP respectively by STA1 to STA3 on an overlapping time resource.

That is, the sub-bands allocated to the respective STAs may have different sizes, and the AP may transmit downlink frames to the respective STAs through the sub-bands of different sizes.

Figure 6:
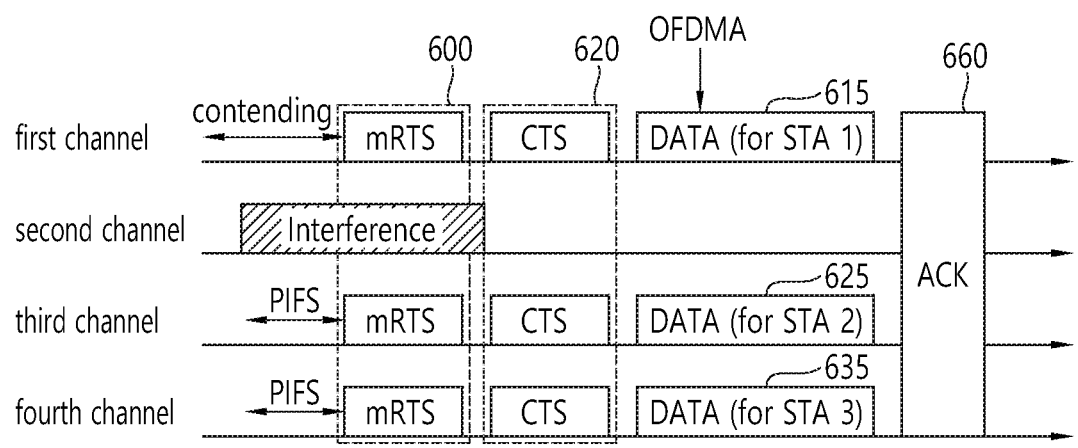
FIG. 6 is a conceptual view illustrating a medium protection method in OFDMA-based communication in a WLAN according to an embodiment of the present invention.
Figure 6:
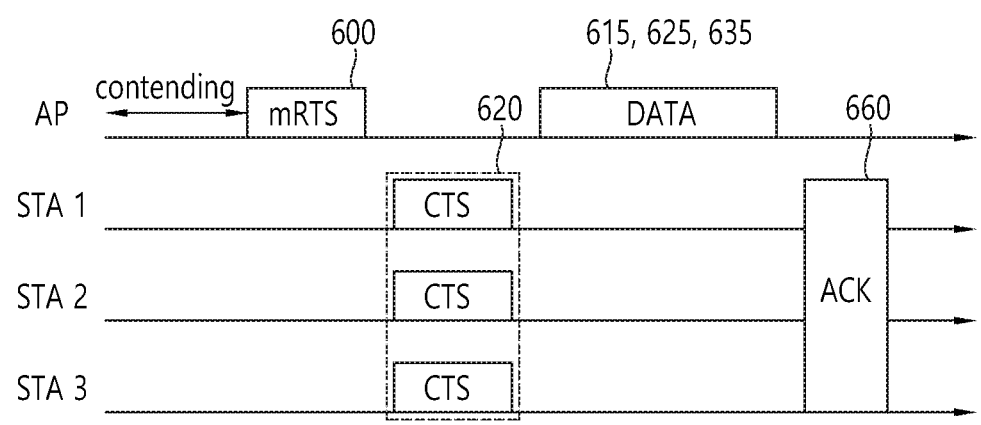

FIG. 6 is a conceptual view illustrating a medium protection method in OFDMA-based communication in a WLAN according to an embodiment of the present invention.

FIG. 6 illustrates a case where an AP performs medium protection based on an RTS frame 600 and a CTS frame 620 and transmits downlink data 615, 625, and 635 respectively to a plurality of STAs based on DL MU OFDMA transmission, in which interference occurs in a specific channel (or a specific channel is busy).

Referring to FIG. 6, as described above in FIG. 4, when the AP determines that interference occurs in a specific channel (for example, a second channel, or when the specific channel is sensed or determined to be busy), the AP may not transmit the RTS frame 600 through the specific channel.

When the AP senses that the second channel is busy, the AP may transmit the RTS frame 600 based on a duplicated PPDU format through first, third, and fourth channels. An RA field of the RTS frame 600 may include ID information on each of the plurality of STAs (or a group of the plurality of STAs) to receive the downlink data through the first, third, and fourth channels. In FIG. 6, the RA field of the RTS frame 600 may include ID information on each of STA1, STA2, and STA3 or ID information on a group including STA1, STA2, and STA3.

Each of the STAs may transmit the CTS frame 620 in response to the RTS frame 620 through a channel which is used to receive the RTS frame 600. For example, STA1 may receive the RTS frame 600 through the first, third, and fourth channels. When the first, third, and fourth channels are idle, STA1 may transmit the CTS frame 620 in response to the RTS frame 600 through the first, third, and fourth channels. Likewise, when STA2 and STA3 receive the RTS frame 600 through the first, third, and fourth channels, STA2 and STA3 may determine whether the first, third, and fourth channels are idle to transmit the CTS frame 620 in response to the RTS frame 600. The CTS frame 620 may have a duplicated format.

Hereinafter, it is assumed that the AP receives the CTS frame 620 through the first, third, and fourth channels.

The AP may receive the CTS frame 620 from the plurality of STAs and may transmit the downlink data 615, 625, and 635 to the respective STAs through the channels used to receive the CTS frame 620.

Specifically, the AP may transmit, using the PPDU format for DL MU OFDMA, downlink data 1 615 through the first channel allocated for STA1, downlink data 2 625 through the third channel allocated for STA2, and downlink data 3 635 through the fourth channel allocated for STA3. The AP may not use the second channel or may transmit null data through the second channel.

According to another embodiment of the present invention, when contiguous channels are allocated to a plurality of STAs for downlink frame transmission, the AP may transmit the downlink data 625 and 635 to the plurality of STAs using the PPDU format for DL MU OFDMA. When non-contiguous channels are allocated to a specific STA for downlink frame transmission, the AP may transmit the downlink data 615 to the specific STA using a PPDU format for a single STA. In FIG. 6, the AP may transmit downlink data 2 625 and downlink data 3 635 to STA2 and STA3 through the third and fourth channels using the PPDU format for DL MU OFDMA and may transmit downlink data 1 615 to STA1 through the first channel using the PPDU format for the single STA.

Each of the STAs, which have received the downlink data 615, 625, and 635, may transmit an ACK frame 660 in response to the downlink data 615, 625, and 635 to the AP based on UL MU OFDMA.

In FIGS. 4 to 6, it is assumed that a CTS frame is transmitted based on the non-duplicated format or duplicated format. However, a CTS frame may be transmitted by a plurality of STAs through channels allocated for the respective STAs based on an RTS frame. For example, an RA field of an RTS frame may specify a channel for STA1 to transmit a CTS frame as a first channel, STA2 to transmit a CTS frame as a second channel, STA3 to transmit a CTS frame as a third channel, and STA4 to transmit a CTS frame as a fourth channel. In this case, STA1 may transmit the CTS frame through the first channel in response to the RTS frame, STA2 may transmit the CTS frame through the second channel in response to the RTS frame, STA3 may transmit the CTS frame through the third channel in response to the RTS frame, and STA4 may transmit the CTS frame through the fourth channel in response to the RTS frame.

Figure 7:
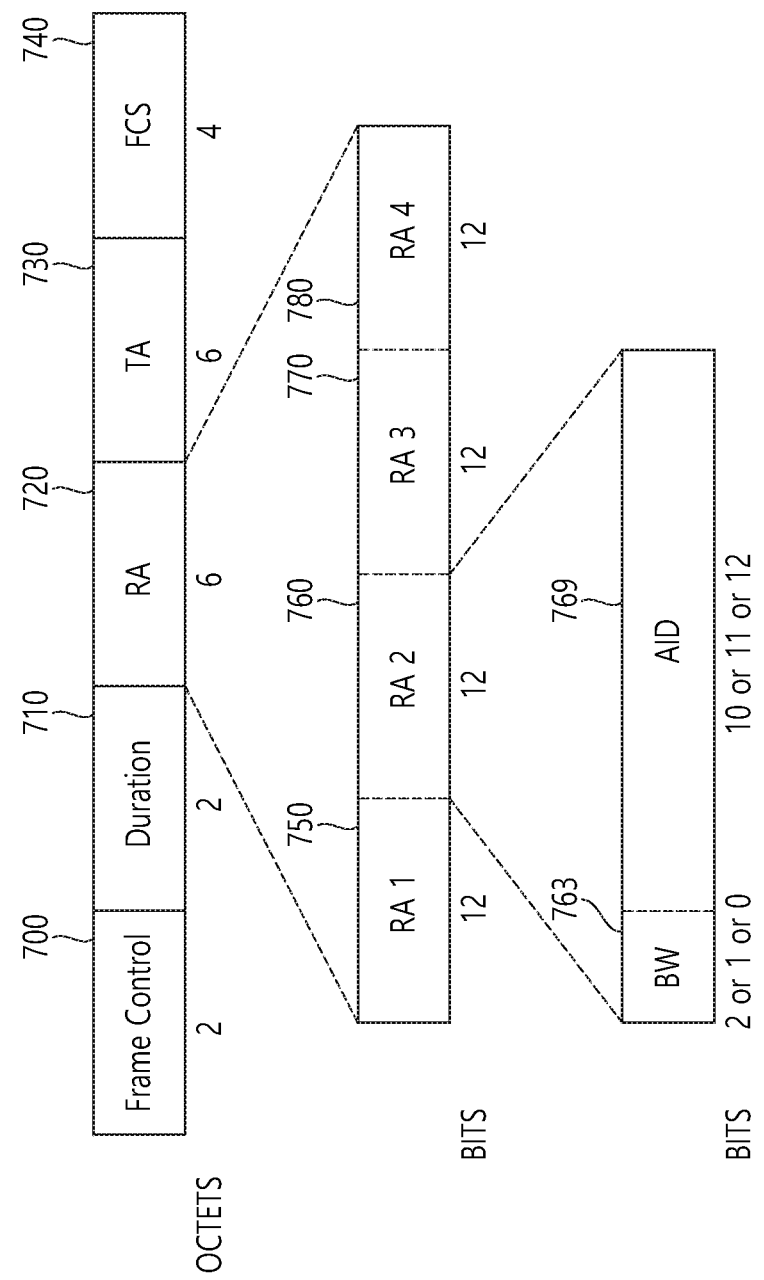
FIG. 7 is a conceptual view illustrating an RTS frame according to an embodiment of the present invention.

FIG. 7 is a conceptual view illustrating an RTS frame according to an embodiment of the present invention.

Referring to FIG. 7, the RTS frame may include a Frame Control field 700, a Duration field 710, an RA field 720, a Transmitter Address (TA) field 730, and a Frame Check Sequence (FCS) 740.

The Frame Control field 700 may include information to indicate the RTS frame.

The Duration field 710 may include duration information for transmission of a CTS frame, a downlink PPDU, and an ACK frame.

The RA field 720 may include ID information on each of a plurality of STAs to receive the RTS frame and to respond with a CTS frame (or to receive downlink data transmitted based on DL MU transmission) or ID information on a group including the plurality of STAs. Further, the RA field 720 may further include information on a channel allocated for each of the plurality of STAs to transmit a CTS frame. Each of a plurality of STAs to receive the RTS frame and to respond with a CTS frame (or to receive downlink data transmitted based on DL MU transmission) is referred to as a target STA.

When the RA field 720 includes ID information and bandwidth information on four target STAs, the RA field 720 may include sub-RA field 1 750, sub-RA field 2 760, sub-RA field 3 770, and sub-RA field 4 780. Each of the sub-RA fields 750, 760, 770, and 780 may include ID information 769 on a target STA and information 763 on a channel bandwidth used for the target STA to transmit a CTS frame. A channel for a target STA to transmit a CTS frame may be determined in view of the order of the sub-RA fields 750, 760, 770, and 780 and the information on the channel bandwidth, which are included in the RA field 720.

For example, sub-RA field 1 750 may include ID information on STA1 and information indicating a 20 MHz channel bandwidth, sub-RA field 2 760 may include ID information on STA2 and information indicating a 20 MHz channel bandwidth, sub-RA field 3 770 may include ID information on STA3 and information indicating a 20 MHz channel bandwidth, and sub-RA field 4 780 may include ID information on STA4 and information indicating a 20 MHz channel bandwidth. In this case, for transmission of a CTS frame, STA1, STA2, STA3, and STA4 may sequentially be allocated a first channel, a second channel, a third channel, and a fourth channel.

Alternatively, the RA field may include four sub-RA fields, in which three sub-RA fields may include valid information and one sub-RA field may include null data. Specifically, sub-RA field 1 750 may include ID information on STA1 and information indicating a 20 MHz channel bandwidth, sub-RA field 2 760 may include ID information on STA2 and information indicating a 40 MHz channel bandwidth, and sub-RA field 3 770 may include ID information on STA3 and information indicating a 20 MHz channel bandwidth. Sub-RA field 4 780 may include null data (for example, a data sequence with a bit value of 0). In this case, for transmission of a CTS frame, STA1, STA2, and STA3 may sequentially be allocated the first channel, the second and third channels, and the fourth channel.

After receiving the RTS frame, an STA may decode the RA field 720 using an existing method for decoding an RTS frame in a legacy format. If decoding fails, the STA may decode the RA field 720 in view of a structure of the RA field 720 including a plurality of sub-RA fields 750, 760, 770, and 780 according to the embodiment of the present invention.

The TA field 730 may include an address of an AP transmitting the RTS frame.

The FCS field 740 may include information for identifying validity of a frame.

Figure 8:
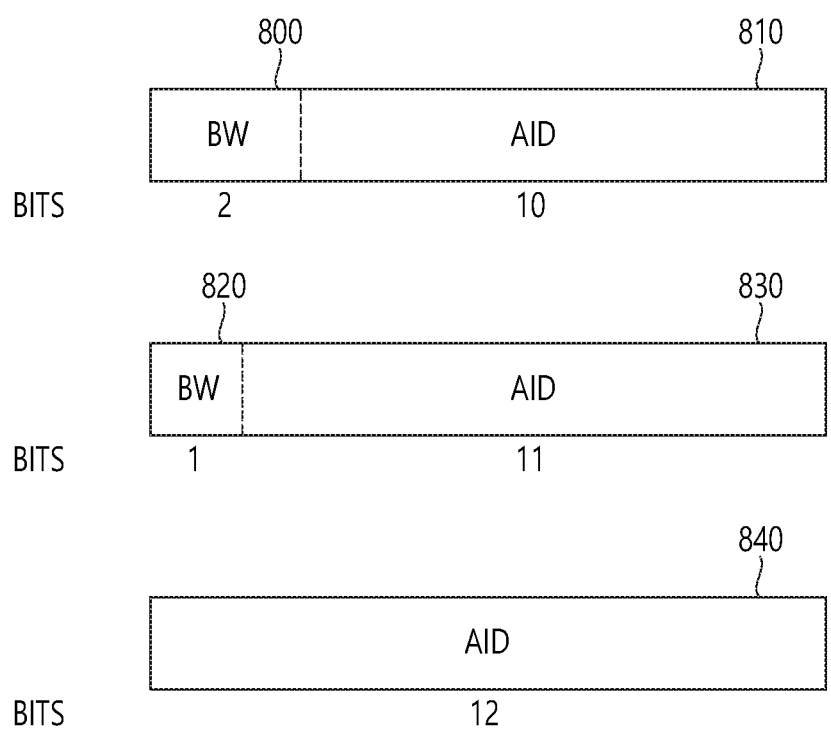
FIG. 8 is a conceptual view illustrating sub-RA fields of an RTS frame according to an embodiment of the present invention.

FIG. 8 is a conceptual view illustrating sub-RA fields of an RTS frame according to an embodiment of the present invention.

FIG. 8 illustrates ID information and bandwidth information on a target STA in detail when the sub-RA fields are allocated 12 bits.

Referring to the upper part of FIG. 8, bandwidth information 800 may be allocated two bits and ID information 810 on the target STA may be allocated ten bits. The two-bit bandwidth information 800 of 00 may indicate 20 MHz, the two-bit bandwidth information 800 of 01 may indicate 40 MHz, the two-bit bandwidth information 800 of 10 may indicate 60 MHz, and the two-bit bandwidth information 800 of 11 may indicate 20 MHz. When the ID information 810 on the target STA is allocated ten bits, the ten bits may indicate ID information (AID) on the target STA. The ten-bit ID information 810 on the target STA may indicate one AID among 1 to 1023.

Referring to the middle part of FIG. 8, bandwidth information 820 may be allocated one bit and ID information 830 on the target STA may be allocated 11 bits. The one-bit bandwidth information 820 of 0 may indicate 20 MHz, and the one-bit bandwidth information 820 of 1 may indicate 40 MHz. When the ID information 830 on the target STA is allocated 11 bits, the 11 bits may indicate ID information (AID) on the target STA. The 11-bit ID information 830 on the target STA may indicate one AID among 1 to 2007. AIDs corresponding to 2008 to 2047 may be reserved, not occupied.

Referring to the lower part of FIG. 8, only ID information 840 on the target STA may be allocated 12 bits. The 12-bit ID information 840 on the target STA may indicate one AID among 1 to 2007. AIDs corresponding to 2008 to 4095 may be reserved, not occupied.

Figure 9:
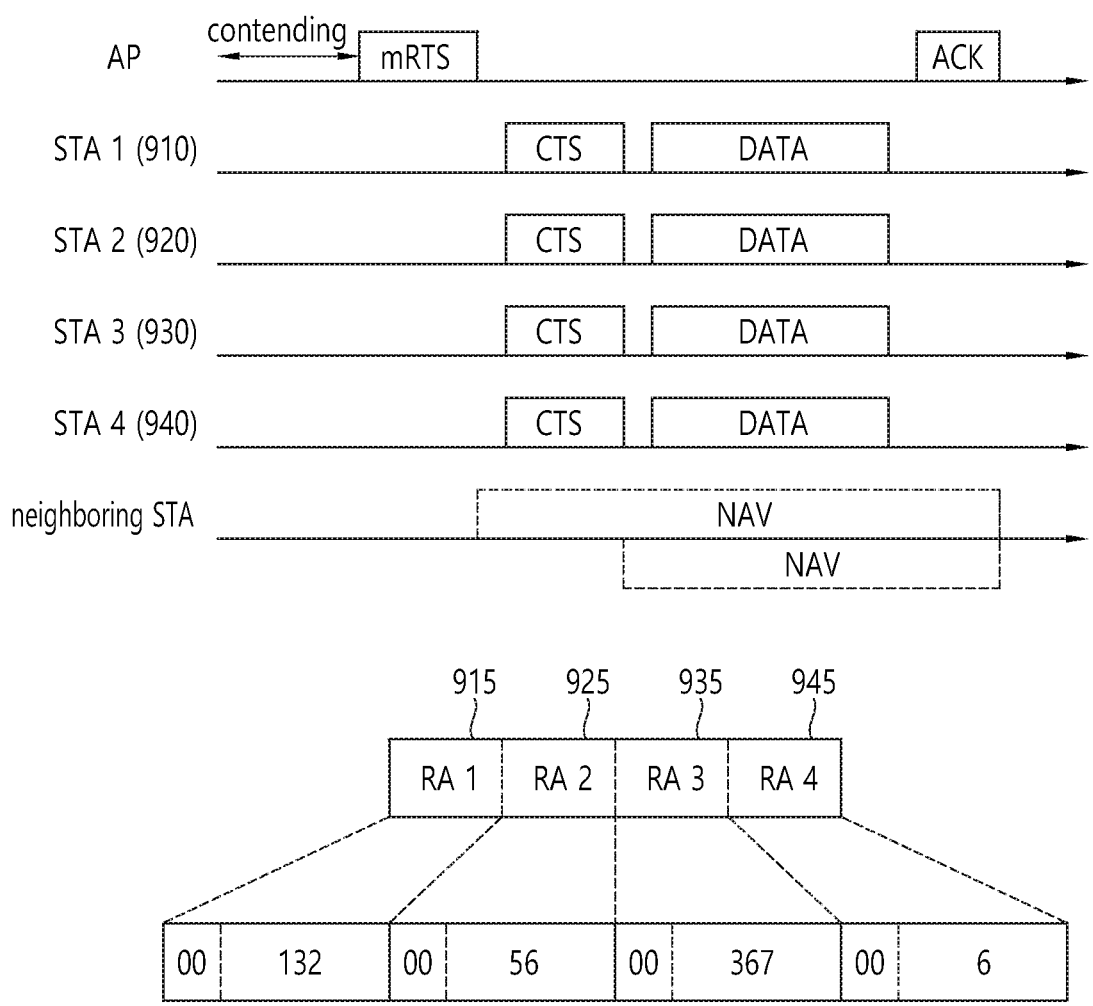
FIG. 9 is a conceptual view illustrating a format of an RTS frame according to an embodiment of the present invention.

FIG. 9 is a conceptual view illustrating a format of an RTS frame according to an embodiment of the present invention.

FIG. 9 illustrates that an RA field of the RTS frame includes four sub-RA fields, each of which includes ID information and bandwidth information on each of four target STAs.

Referring to FIG. 9, the RA field may sequentially include sub-RA field 1 915, sub-RA field 2 925, sub-RA field 3 935, and sub-RA field 4 945.

Sub-RA field 1 915 may include ID information (132) indicating STA1 910 and bandwidth information (00) for STA1 910. Sub-RA field 2 925 may include ID information (56) indicating STA2 920 and bandwidth information (00) for STA2 920. Sub-RA field 3 935 may include ID information (367) indicating STA3 930 and bandwidth information (00) for STA3 930. Sub-RA field 4 945 may include ID information (6) indicating STA4 940 and bandwidth information (00) for STA4 940. As described above, bandwidth information of 00 may indicate a 20 MHz bandwidth.

STA1 910 may transmit a CTS frame through a first channel of 20 MHz, STA 2 920 may transmit a CTS frame through a second channel of 20 MHz, STA3 930 may transmit a CTS frame through a third channel of 20 MHz, and STA4 940 may transmit a CTS frame through a fourth channel of 20 MHz.

An AP may receive the CTS frames and may transmit downlink data to STA1 910, STA2 920, STA3 930, and STA4 940 in response to the CTS frames.

STA1 910, STA2 920, STA3 930, and STA4 940 may each receive the downlink data frame and may transmit an ACK frame in response to the downlink frame.

That is, in order to transmit a data unit in a WLAN, the AP may transmit an RTS frame for medium protection to a plurality of STAs through a plurality of channels and may receive a CTS frame from each of the plurality of STAs through a first allocated channel in response to the RTS frame. The first allocated channel may be at least one channel among a plurality of channels determined based on the RTS frame. Further, the AP may transmit downlink data to each of the plurality of STAs through a second allocated channel based on OFDMA on an overlapping time resource. The second allocated channel may be at least one channel among the plurality of channels used to transmit the RTS frame. The second allocated channel may be determined based on channel allocation information included in a PPDU header of a downlink PPDU carrying the downlink data.

The plurality of channels used to transmit the RTS frame may each have a bandwidth of 20 MHz, and the RTS frame may be transmitted via a duplicated format PPDU through the plurality of channels. Alternatively, the plurality of channels used to transmit the RTS frame may each have a bandwidth of 5 MHz, the number of the plurality of channels may be four, and the RTS frame may be transmitted via a non-duplicated format PPDU through the plurality of channels.

Figure 10:
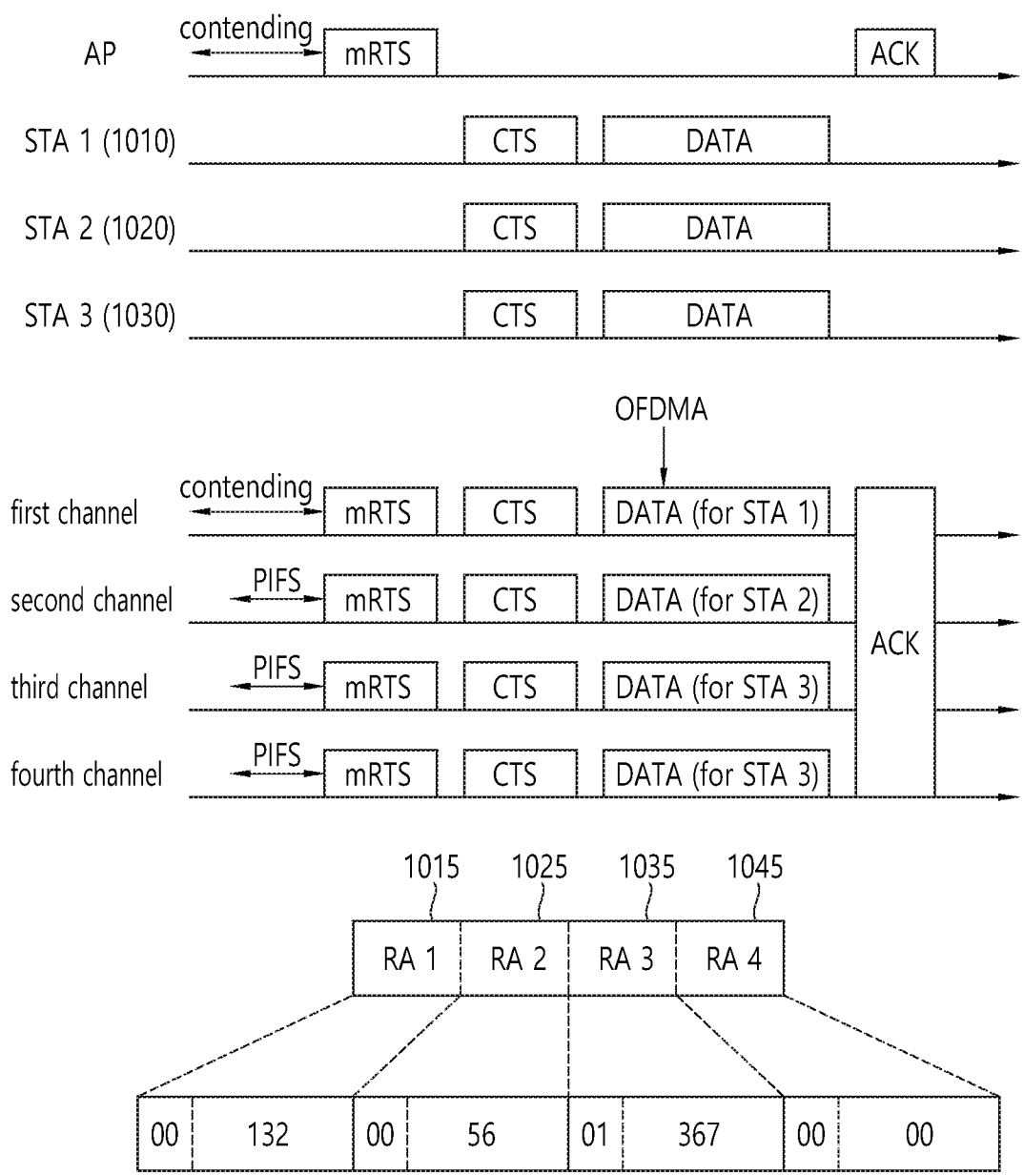
FIG. 10 is a conceptual view illustrating a format of an RTS frame according to an embodiment of the present invention.

FIG. 10 is a conceptual view illustrating a format of an RTS frame according to an embodiment of the present invention.

FIG. 10 illustrates that an AP transmits an RTS frame to three target STAs. An RA field of the RTS frame includes four sub-RA fields, three of which may each include ID information and bandwidth information on each of the three target STAs and one of which may include null data (for example, a bit value of 0).

Referring to FIG. 10, sub-RA field 1 1015 may include ID information (132) indicating STA1 1010 and bandwidth information (00) for STA1 1010. Sub-RA field 2 1025 may include ID information (56) indicating STA2 1020 and bandwidth information (00) for STA2 1020. Sub-RA field 3 1035 may include ID information (367) indicating STA3 1030 and bandwidth information (01) for STA3 1030. As described above, bandwidth information of 00 may indicate a 20 MHz bandwidth, and bandwidth information of 01 may indicate a 40 MHz bandwidth. Sub-RA field 4 1045 may include null data (for example, a bit sequence with a bit value of 0) as ID information on the target STAs.

STA1 1010 may be allocated a first channel based on sub-RA field 1 1015 and may transmit a CTS frame on the first channel. STA2 1020 may be allocated a second channel based on sub-RA field 2 1025 and may transmit a CTS frame on the second channel. STA3 1030 may be allocated third and fourth channels based on sub-RA field 3 1035 and may transmit a CTS frame on the third and fourth channels.

Figure 11:
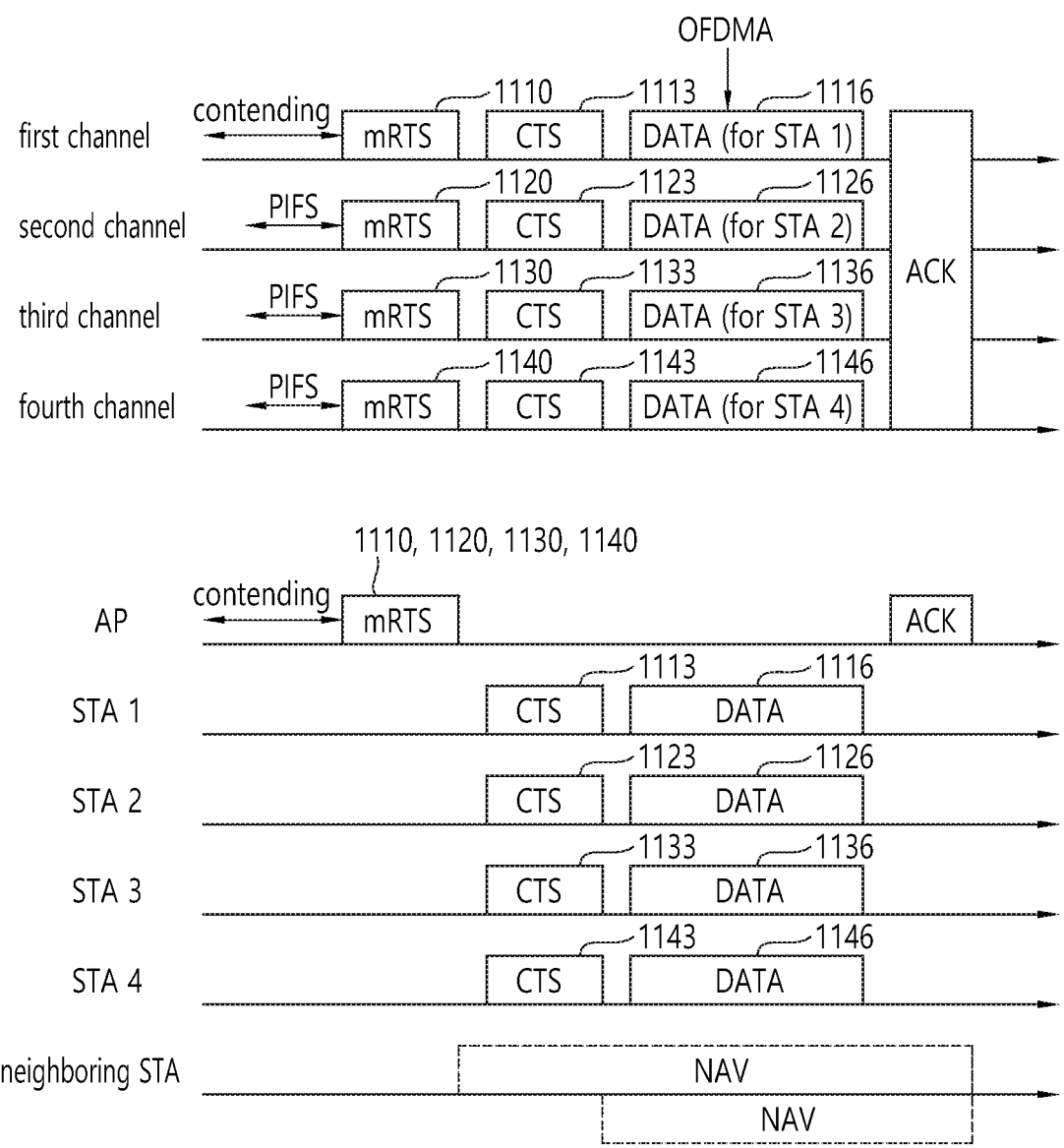
FIG. 11 is a conceptual view illustrating a medium protection method in OFDMA-based communication in a WLAN according to an embodiment of the present invention.

FIG. 11 is a conceptual view illustrating a medium protection method in OFDMA-based communication in a WLAN according to an embodiment of the present invention.

FIG. 11 illustrates a method for an AP to transmit a plurality of RTS frames through a plurality of channels, respectively.

Referring to FIG. 11, the AP may transmit a plurality of RTS frames 1110, 1120, 1130, and 1140 to a plurality of STAs through a plurality of channels, respectively. The plurality of RTS frames 1110, 1120, 1130, and 1140 respectively transmitted to the plurality of STAs through the plurality of channels may be different RTS frames. That is, the RTS frames may include different data.

For example, the AP may transmit, based on DL MU OFDMA transmission: RTS frame 1 1110 to STA1 through a first channel; RTS frame 2 1120 to STA2 through a second channel; RTS frame 3 1130 to STA3 through a third channel; and RTS frame 4 1140 to STA4 through a fourth channel. An RA field of RTS frame 1 1110 may include ID information on STA1 to receive RTS frame 1 1110. An RA field of RTS frame 2 1210 may include ID information on STA2 to receive RTS frame 2 1210. An RA field of RTS frame 3 1130 may include ID information on STA3 to receive RTS frame 3 1130. An RA field of RTS frame 4 1140 may include ID information on STA4 to receive RTS frame 4 1140.

Alternatively, similarly to a method of transmitting an RTS PPDU of a duplicated format PPDU, the AP may perform a back-off procedure for channel access to an established first channel. Specifically, the AP may perform TXOP initial access through the back-off procedure in the first channel. The AP may identify channel states of second to and fourth channels during a PIFS prior to the expiry of a back-off timer. That is, the AP may determine the channel states of the second, third, and fourth channels during the PIFS prior to a TXOP in order to identify whether the second, third, and fourth channels are idle or busy. If the second, third, and fourth channels are idle during the PIFS, the AP may transmit RTS frame 1 1110, RTS frame 2 1120, RTS frame 3 1130, and RTS frame 4 1140 through the first, second, third, and fourth channels, respectively.

When the AP transmits the RTS frames 1110, 1120, 1130, and 1140 based on DL MU OFDMA transmission, the AP may transmit the RTS frames 1110, 1120, 1130, and 1140 to the respective STAs through a downlink PPDU format for DL MU OFDMA. Each of the STAs may decode a PPDU header to acquire information on a channel allocated to each of the STAs. The respective STAs may receive the RTS frames 1110, 1120, 1130, and 1140 through channels allocated for the respective STAs.

The respective STAs, which have received the RTS frames 1110, 1120, 1130, and 1140, may transmit CTS frames 1113, 1123, 1133, and 1143 to the AP. The respective STAs may transmit the CTS frames 1113, 1123, 1133, and 1143 to the AP through the channels used to receive the RTS frames 1110, 1120, 1130, and 1140.

The AP, which has received the CTS frames 1113, 1123, 1133, and 1143 from the plurality of STAs, may transmit downlink data 1116, 1126, 1136, and 1146 to the respective STAs.

Figure 12:
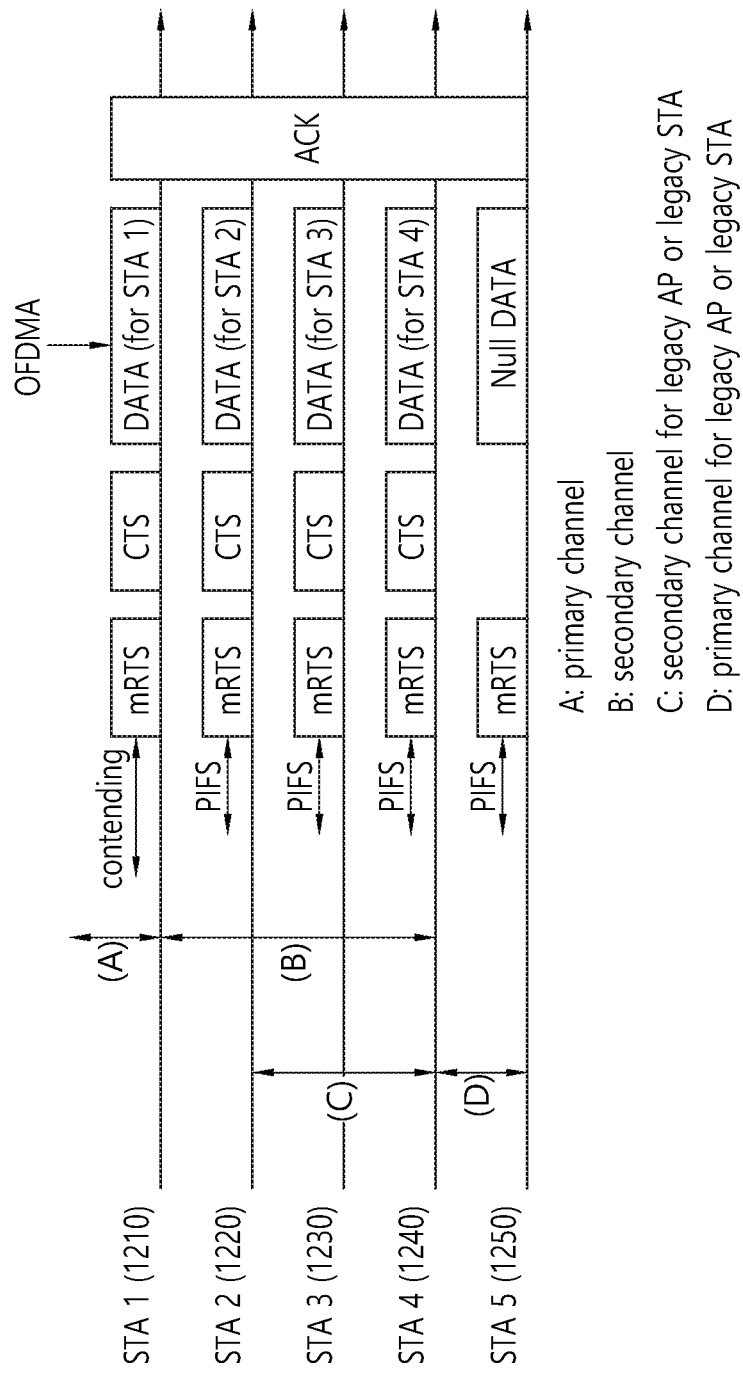
FIG. 12 illustrates a method for preventing interference between WLAN systems according to an embodiment of the present invention.

FIG. 12 illustrates a method for preventing interference between WLAN systems according to an embodiment of the present invention.

FIG. 12 illustrates a method for preventing interference between a WLAN system that supports DL MU OFDMA transmission and UL MU OFDMA transmission according to an embodiment of the present invention and a legacy WLAN system that does not support DL MU OFDMA transmission and UL MU OFDMA transmission according to the embodiment of the present invention.

Hereinafter, an AP and an STA may refer to an AP and an STA that operate in the WLAN system supporting DL MU OFDMA transmission and UL MU OFDMA transmission, while a legacy AP and a legacy STA may refer to an AP and an STA that operate in the legacy WLAN system not supporting DL MU OFDMA transmission and UL MU OFDMA transmission.

Referring to FIG. 12, the AP may perform a back-off procedure for channel access to an established first channel (primary channel) 1210. Specifically, the AP may perform TXOP initial access through the back-off procedure in the first channel 1210. The AP may identify channel states of a second channel 1220, a third channel 1230, and a fourth channel 1240 (secondary channels) during a PIFS prior to the expiry of a back-off timer.

The secondary channels (the second channel 1220, third channel 1230, and fourth channel 1240) of the AP may overlap with secondary channels 1230 and 1240 of the legacy AP or legacy STA. In this case, the AP may identify a channel state of even a primary channel 1250 of the legacy AP or legacy STA, and may transmit an RTS frame through the primary channel 1250 of the legacy AP or legacy SAT when the channel is idle.

Specifically, the AP may have information on the primary channel 1250 and the secondary channels 1230 and 1240 of the legacy AP or legacy STA included in a BSS having the possibility of interference. The AP may determine whether the secondary channels 1220, 1230, and 1240 to use for transmission of the RTS frame overlap with the secondary channels 1230 and 1240 of the legacy AP or legacy STA. If the secondary channels 1220, 1230, and 1240 to use for transmission of the RTS frame overlap with the secondary channels 1230 and 1240 of the legacy AP or legacy STA, the AP may determine whether the primary channel 1250 of the legacy AP or legacy STA is idle to transmit the RTS frame.

The AP may also use the primary channel 1250 of the legacy AP or legacy STA as an additional channel to transmit a downlink frame based on DL MU OFDMA transmission. The following embodiment of the present invention is described assuming that the AP does not use the primary channel 1250 of the legacy AP or legacy STA as an additional channel for downlink frame transmission based on DL MU OFDMA. Hereinafter, the primary channel 1250 of the legacy AP or legacy STA used for the AP to transmit the RTS frame may be referred to as an additional secondary channel.

The AP may transmit the RTS frame through the first channel 1210 as a primary channel, the second channel 1220, the third channel 1230, and the fourth channel 1240 as secondary channels, and a fifth channel 1250 as an additional secondary channel.

The AP may allocate only the first channel 1210, the second channel 1220, the third channel 1230, and the fourth channel 1240 as channels for transmission of a CTS frame and may receive CTS frames respectively from a plurality of STAs through the first channel 1210, the second channel 1220, the third channel 1230, and the fourth channel 1240. That is, no CTS frame may be transmitted through the fifth channel 1250.

The AP may transmit downlink data to the plurality of STAs through the first channel 1210, the second channel 1220, the third channel 1230, and the fourth channel 1240, respectively.

The AP may transmit null data through the fifth channel 1250, and the legacy STA or legacy AP may set an NAV based on a header of a PPDU carrying the null data. Using this method may prevent interference by the legacy STA or legacy AP operating in the legacy WLAN system.

Figure 13:
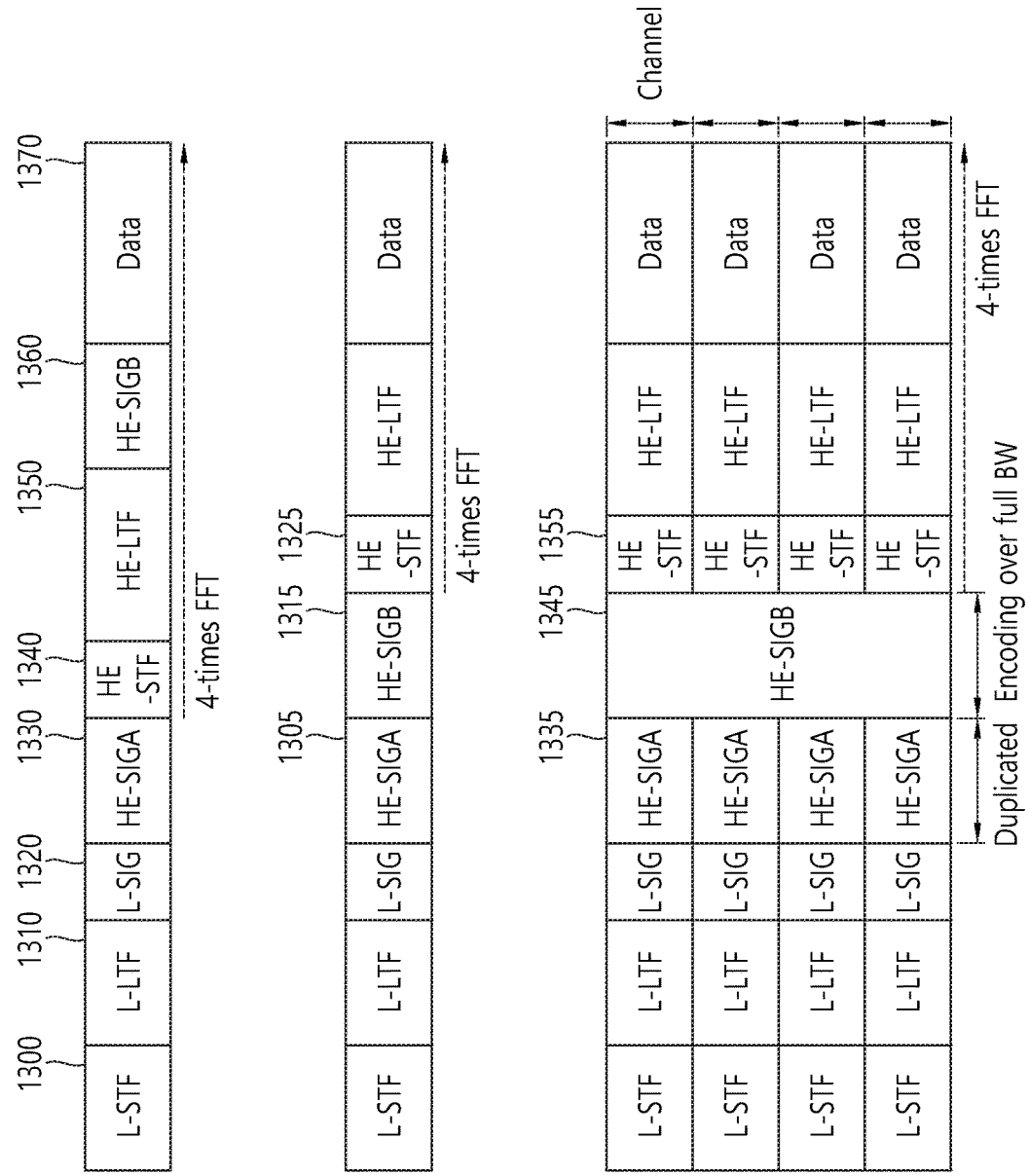
FIG. 13 is a conceptual view illustrating PPDU formats for frame transmission according to an embodiment of the present invention.

FIG. 13 is a conceptual view illustrating PPDU formats for frame transmission according to an embodiment of the present invention.

FIG. 13 illustrates PPDU formats according to an embodiment of the present invention. The PPUD formats illustrated in FIG. 13 may be used for transmission of an ACK frame transmitted based on UL MU OFDMA transmission and downlink data transmitted based on DL MU OFDMA transmission.

For example, PPDU formats illustrated in the upper part and the middle part of FIG. 13 may be used to carry an ACK frame transmitted based on UL MU OFDMA transmission, while a PPDU format illustrated in the lower part of FIG. 13 may be used to carry downlink data for each of a plurality of STAs transmitted based on DL MU OFDMA transmission.

The PPDU formats illustrated in FIG. 13 may also be used for transmission of an RTS frame and a CTS frame based on DL MU OFDMA or UL MU OFDMA. For example, when an RTS frame is transmitted by an AP based on DL MU OFDMA, the PPDU format illustrated in the lower part of FIG. 13 may be used to carry the RTS frame. Alternatively, when CTS frames are transmitted by a plurality of STAs based on UL MU OFDMA, the PPDU format illustrated in the upper or middle part of FIG. 13 may be used to carry the CTS frames.

Referring to the upper part of FIG. 13, a PHY header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). The downlink PPDU may be divided into a legacy part from the PHY header to the L-SIG and a high efficiency (HE) part after the L-SIG.

The L-STF 1300 may include a short training orthogonal frequency division multiplexing (OFDM) symbol. The L-STF 1300 may be used for frame detection, automatic gain control (AGC), diversity detection, and coarse frequency/time synchronization.

The L-LTF 1310 may include a long training OFDM symbol. The L-LTF 1310 may be used for fine frequency/time synchronization and channel estimation.

The L-SIG 1320 may be used to transmit control information. The L-SIG 1320 may include information on data rate and data length. As described above, a legacy STA may set an NAV based on the information included in the L-SIG.

The HE-SIG A 1330 may include information to indicate a STA to receive the PPDU. For example, the HE-SIG A 1330 may include an identifier of a specific STA (or AP) to receive the PPDU and information to indicate a group of the specific STA. Further, when the PPDU is transmitted based on OFDMA or MIMO, the HE-SIG A 1330 may include resource allocation information on the STA.

In addition, the HE-SIG A 1330 may also include color bits information for BSS ID information, bandwidth information, a tail bit, a CRC bit, modulation and coding scheme (MCS) information on the HE-SIG B 1360, symbol number information for the HE-SIG B 1360, and cyclic prefix (CP or guard interval (GI)) length information.

The HE-STF 1340 may be used to improve automatic gain control estimation in an MIMO environment or OFDMA environment.

The HE-LTF 1350 may be used to estimate a channel in the MIMO environment or OFDMA environment.

The HE-SIG B 1360 may include information on physical layer service data unit (PSDU) length and a modulation and coding scheme (MCS) for each STA, tail bits, and the like. Further, the HE-SIG B 1360 may include information on an STA to receive the PPDU and OFDMA-based resource allocation information (or MU-MIMO information). When the OFDMA-based resource allocation information (or MU-MIMO information) is included in the HE-SIG B 1360, the HE-SIG A 1330 may not include resource allocation information.

An inverse fast Fourier transform (IFFT) applied to the HE-STF 1340 and fields after the HE-STF 1340 may have a different size from an IFFT applied to fields before the HE-STF 1340. For example, the IFFT applied to the HE-STF 1340 and the fields after the HE-STF 1340 may have a size four times larger than that applied to the fields before the HE-STF 1340. An STA may receive the HE-SIG A 1330 and may be instructed to receive the downlink PPDU based on the HE-SIG A 1330. In this case, the STA may decode the HE-STF 1340 and the fields after the HE-STF 1340 based on an FFT with a modified size. However, when the STA is not instructed to receive the downlink PPDU based on the HE-SIG A 1330, the STA may stop decoding and may set a network allocation vector (NAV). A cyclic prefix (CP) of the HE-STF 1340 may have a larger size than CPs of other fields, and the STA may decode the downlink PPDU by changing the FFT size during CP duration.

The fields of the PPDU format illustrated in the upper part of FIG. 13 may be configured in a different order. For example, as illustrated in the middle part of FIG. 13, the HE-SIG B 1315 of the HE part may be positioned immediately after the HE-SIG A 1305. The STA may decode up to the HE-SIG A 1305 and the HE-SIG B 1315, receive necessary control information, and set an NAV. Likewise, an IFFT applied to the HE-STF 1325 and fields after the HE-STF 1325 may have a different size from an IFFT applied to fields before the HE-STF 1325.

The STA may receive the HE-SIG A 1305 and the HE-SIG B 1315. When the STA is instructed to receive the PPDU based on the HE-SIG A 1305, the STA may decode the PPDU by changing an FFT size from the HE-STF 1325. However, when the STA receives the HE-SIG A 1305 and is not instructed to receive the downlink PPDU based on the HE-SIG A 1305, the STA may set an NAV.

The lower part of FIG. 13 illustrates a PPDU format for DL MU OFDMA transmission. According to the embodiment of the present invention, the AP may transmit downlink frames or downlink PPDUs to a plurality of STAs using the PPDU format for DL MU OFDMA transmission. The respective downlink PPDUs may be transmitted to the STAs through different transmission resources (frequency resources or spatial streams). Fields before the HE-SIG B 1345 in the PPDU may be transmitted in a duplicated form through different transmission resources. The HE-SIG B 1345 may be transmitted in an encoded form on all transmission resources. Fields after the HE-SIG B 1345 may include individual information for each of a plurality of STAs receiving PPDUs.

For example, the HE-SIG A 1335 may include ID information on a plurality of STAs to receive downlink data and information on a channel used to transmit the downlink data to the plurality of STAs. Alternatively, the HE-SIG A 1335 may include ID information on a plurality of STAs to receive an RTS frame and information on a channel used to transmit the RTS frame to the plurality of STAs.

When the fields included in the PPDU are transmitted through transmission resources, respectively, CRCs for the respective fields may be included in the PPDU. However, when a particular field in the PPDU is transmitted in the encoded form on all transmission resources, the CRCs for the respective fields may not be included in the PPDU. Accordingly, CRC overhead may be reduced.

In the PPDU format for DL MU transmission, the HE-STF 1355 and fields after the HE-STF 1355 may also be encoded based on a different IFFT size from that for fields before the HE-STF 1355. Thus, when the STA receives the HE-SIG A 1335 and the HE-SIG B 1345 and is instructed to receive the PPDU based on the HE-SIG A 1335, the STA may decode the PPDU by changing an FFT size from the HE-STF 1355.

Figure 14:
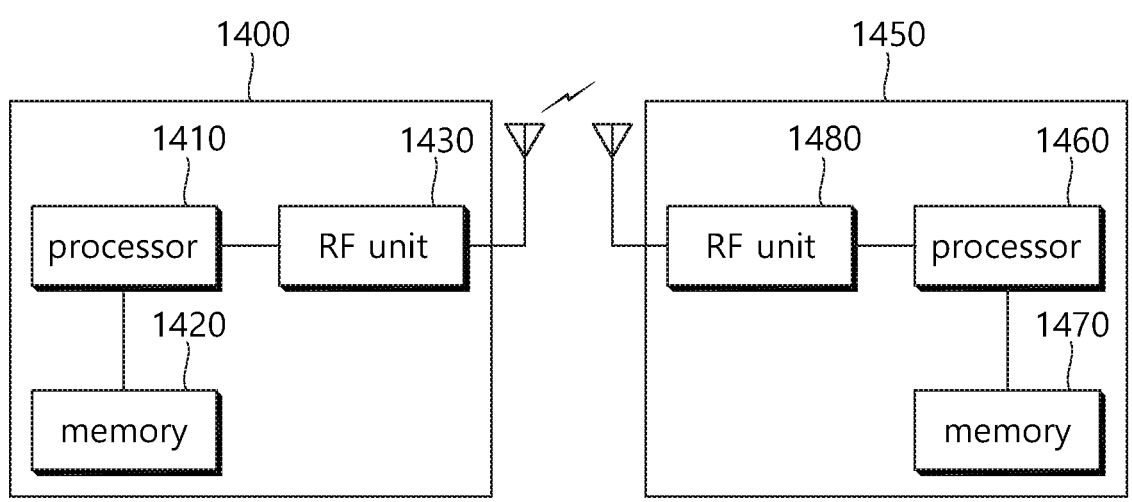
FIG. 14 is a block diagram illustrating a wireless device according to an embodiment of the present invention.

FIG. 14 is a block diagram illustrating a wireless device according to an embodiment of the present invention.

Referring to FIG. 14, the wireless device 1400 may be an STA capable of implementing the foregoing embodiments, which may be an AP 1400 or a non-AP STA (or STA) 1450.

The AP 1400 includes a processor 1410, a memory 1420, and a radio frequency (RF) unit 1430.

The RF unit 1430 may be connected to the processor 1410 to transmit/receive a radio signal.

The processor 1410 may implement functions, processes and/or methods suggested in the present invention. For example, the processor 1410 may be configured to perform operations of the AP according to the foregoing embodiments of the present invention. The processor may perform the operations of the AP illustrated in the embodiments of FIGS. 1 to 13.

For example, the processor 1410 may be configured to: transmit an RTS frame for medium protection to a plurality of STAs through a plurality of channels; receive a CTS frame in response to the RTS frame from each of the STAs through a first allocated channel; and transmit downlink data to each of the plurality of STAs through a second allocated channel based on OFDMA on an overlapping time resource. The first allocated channel may be at least one channel among the plurality of channels determined based on the RTS frame, and the second allocated channel may be at least one channel among the plurality of channels. The RTS frame may include identification information to indicate each of the plurality of STAs and bandwidth information to determine the first allocated channel.

The STA 1450 includes a processor 1460, a memory 1470, and an RF unit 1480.

The RF unit 1480 may be connected to the processor 1460 to transmit/receive a radio signal.

The processor 1460 may implement functions, processes and/or methods suggested in the present invention. For example, the processor 1460 may be configured to perform operations of the STA according to the foregoing embodiments of the present invention. The processor may perform the operations of the STA illustrated in the embodiments of FIGS. 1 to 13.

For example, the processor 1460 may be configured to receive an RTS frame for medium protection and to transmit a CTS frame in response to the RTS frame through a first allocated channel. The first allocated channel may be at least one channel among a plurality of channels determined based on the RTS frame. In addition, the processor 1460 may be configured to receive downlink data through a second allocated channel based on OFDMA on an overlapping time resource. The second allocated channel may be at least one channel among the plurality of channels. The RTS frame may include identification information to indicate each of a plurality of STAs and bandwidth information to determine the first allocated channel.

The processors 1410 and 1460 may include an application-specific integrated circuit (ASIC), other chipsets, a logic circuit, a data processor and/or a converter to convert a baseband signal and a radio signal from one to the other. The memories 1420 and 1470 may include a read-only memory (ROM), a random access memory (RAM), a flash memory, a memory card, a storage medium and/or other storage devices. The RF units 1430 and 1480 may include at least one antenna to transmit and/or receive a radio signal.

When the embodiments are implemented with software, the foregoing techniques may be implemented by a module (process, function, or the like) for performing the foregoing functions. The module may be stored in the memories 1420 and 1470 and be executed by the processors 1410 and 1460. The memories 1420 and 1470 may be disposed inside or outside the processors 1410 and 1460 or be connected to the processors 1410 and 1460 via various well-known means.

What is claimed is:

1. A method of transmitting a frame in a wireless local area network (WLAN), the method comprising:

transmitting, by an access point (AP), a Request to Send (RTS) frame soliciting simultaneous Clear to Send (CTS) responses from a first station (STA) and a second STA, wherein the RTS frame includes first information for identifying each of the first STA and the second STA and second information for a first bandwidth of a first channel allocated for the first STA and a second bandwidth of a second channel allocated for the second STA, wherein the first bandwidth is set to any one of a first bandwidth, a second bandwidth, a third bandwidth, and a fourth bandwidth, and wherein the second bandwidth is set to any one of the first bandwidth, the second bandwidth, the third bandwidth, and the fourth bandwidth;

receiving, by the AP, a first CTS frame and a second CTS frame from the first STA and the second STA during a same time interval in response to the RTS frame, wherein the first CTS frame and the second CTS frame are received based on the first information and the second information; and transmitting, by the AP, a multi user physical protocol data unit (MU PPDU) to the first STA and the second STA after the first CTS frame and the second CTS frame is received.

2. The method of claim 1, wherein the first information includes a first association identifier (AID) for the first STA and a second AID for the second STA.

3. The method of claim 1, wherein the first bandwidth is 20 MHz, the second bandwidth is 40 MHz, the third bandwidth is 60 MHz, and the fourth bandwidth is 80 MHz.

4. The method of claim 1, wherein the RTS frame is transmitted through a plurality of downlink channels, and wherein each of the plurality of downlink channels has a bandwidth of 20 MHz.

5. The method of claim 1, wherein the RTS frame is transmitted via a duplicated format PPDU based on the plurality of downlink channels.

6. An access point (AP) for transmitting a frame in a wireless local area network (WLAN), the AP comprising:

a transceiver configured to transmit or receive a radio signal; and a processor operatively connected to the transceiver, wherein the processor is configured to:
transmit a Request to Send (RTS) frame soliciting simultaneous Clear to Send (CTS) responses from a first station (STA) and a second STA,
wherein the RTS frame includes first information for identifying each of the first STA and the second STA and second information for a first bandwidth of a first channel allocated for the first STA and a second bandwidth of a second channel allocated for the second STA,
wherein the first bandwidth is set to any one of a first bandwidth, a second bandwidth, a third bandwidth, and a fourth bandwidth, and
wherein the second bandwidth is set to any one of the first bandwidth, the second bandwidth, the third bandwidth, and the fourth bandwidth;
receive a first CTS frame and a second CTS frame from the first STA and the second STA during a same time interval in response to the RTS frame,
wherein the first CTS frame and the second CTS frame are received based on the first information and the second information; and
transmit a multi user physical protocol data unit (MU PPDU) to the first STA and the second STA after the first CTS frame and the second CTS frame is received.

7. The AP of claim 6,
wherein the first information includes a first association identifier (AID) for the first STA and a second AID for the second STA.

8. The AP of claim 6, wherein the first bandwidth is 20 MHz, the second bandwidth is 40 MHz, the third bandwidth is 60 MHz, and the fourth bandwidth is 80 MHz.

9. The AP of claim 6, wherein the RTS frame is transmitted through a plurality of downlink channels, and
wherein each of the plurality of downlink channels has a bandwidth of 20 MHz.

10. The AP of claim 6, wherein the RTS frame is transmitted via a duplicated format PPDU based on the plurality of downlink channels.

11. A method of receiving a frame in a wireless local area network (WLAN), the method comprising:
receiving, by a first station (STA), from an access point (AP) a Request to Send (RTS) frame soliciting simultaneous Clear to Send (CTS) responses from the first STA and a second STA,
wherein the RTS frame includes first information for identifying each of the first STA and the second STA and second information for a first bandwidth of a first channel allocated for the first STA and a second bandwidth of a second channel allocated for the second STA,
wherein the first bandwidth is set to any one of a first bandwidth, a second bandwidth, a third bandwidth, and a fourth bandwidth, and
wherein the second bandwidth is set to any one of the first bandwidth, the second bandwidth, the third bandwidth, and the fourth bandwidth;
transmitting, by the first STA, a CTS frame to the AP in response to the RTS frame,
wherein the CTS frame is transmitted via the first channel based on the first information and the second information; and
receiving, by the first STA, a multi user physical protocol data unit (MU PPDU) from the AP after the CTS frame is transmitted.

12. The method of claim 11, wherein the first information includes a first association identifier (AID) for the first STA and a second AID for the second STA.

13. The method of claim 11, wherein the first bandwidth is 20 MHz, the second bandwidth is 40 MHz, the third bandwidth is 60 MHz, and the fourth bandwidth is 80 MHz.

14. The method of claim 11, wherein the RTS frame is transmitted through a plurality of downlink channels, and
wherein each of the plurality of downlink channels has a bandwidth of 20 MHz.

15. The method of claim 11, wherein the RTS frame is transmitted via a duplicated format PPDU based on the plurality of downlink channels.

* * * * *